Figure 15:
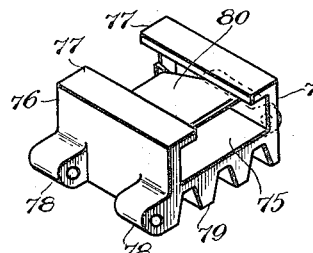

M. PARIDON & T. A. PALMER.
MACHINE FOR MAKING MATCH BOOKS.
APPLICATION FILED NOV. 9, 1907.
1,042,472.
Patented Oct. 29, 1912.
17 SHEETS—SHEET 1.
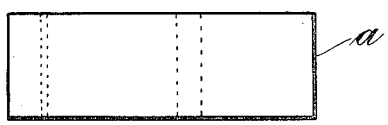
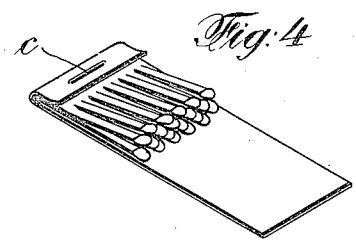
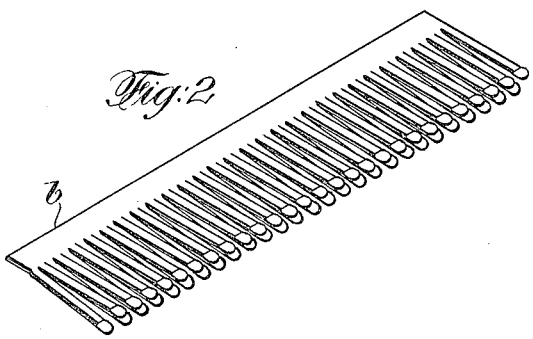
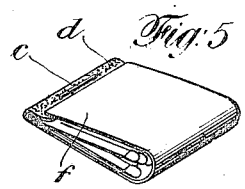
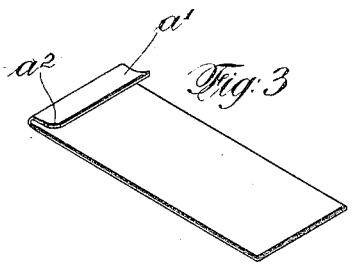
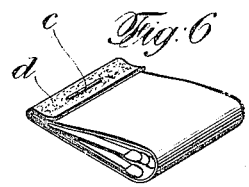
WITNESSES:
INVENTORS
Michael Paridon,
Thomas A. Palmer,
BY
John R. Nolan
ATTORNEY

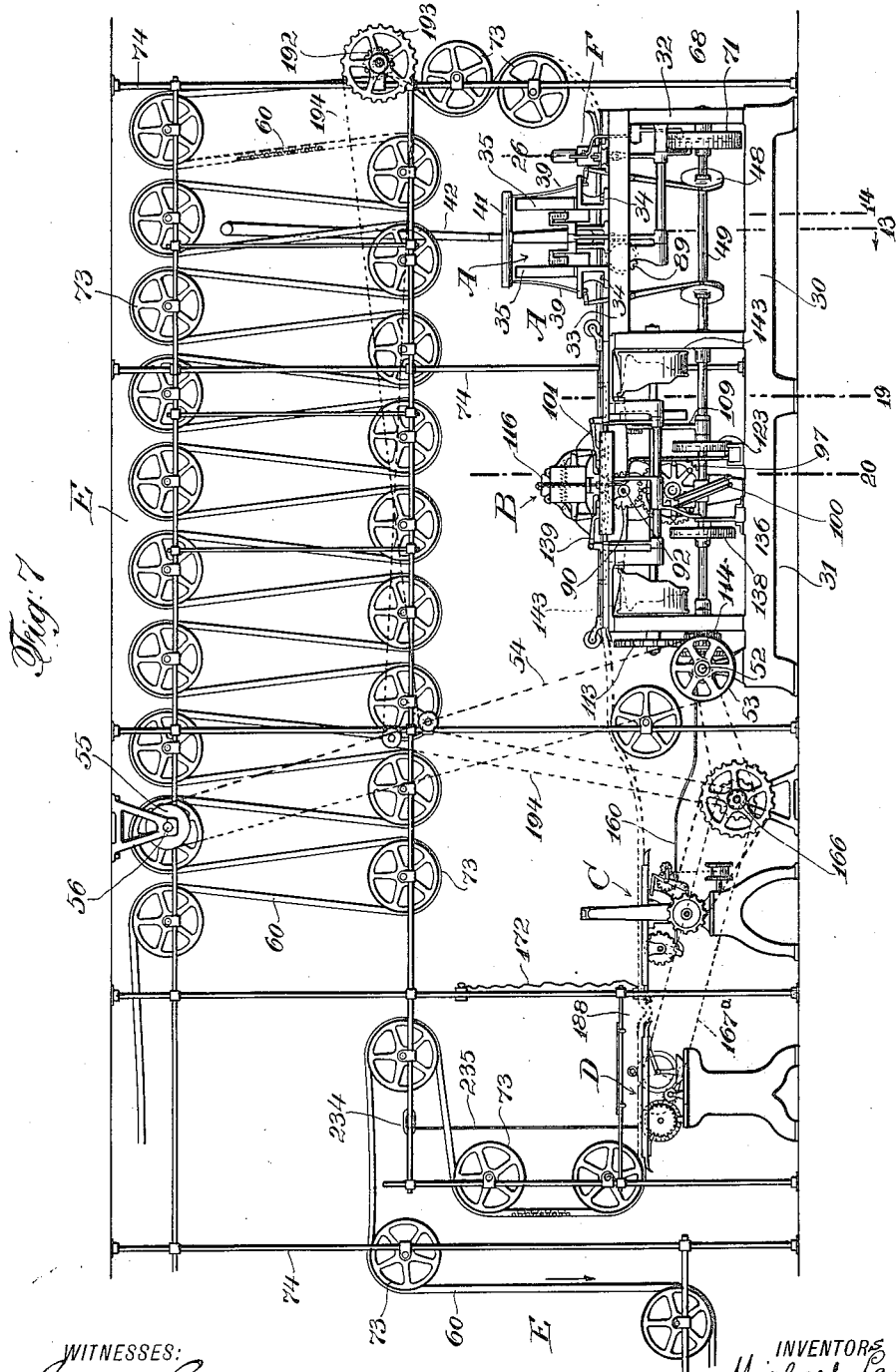

M. PARIDON & T. A. PALMER.
MACHINE FOR MAKING MATCH BOOKS.
APPLICATION FILED NOV. 9, 1907.

1,042,472.

Patented Oct. 29, 1912.

17 SHEETS—SHEET 3.

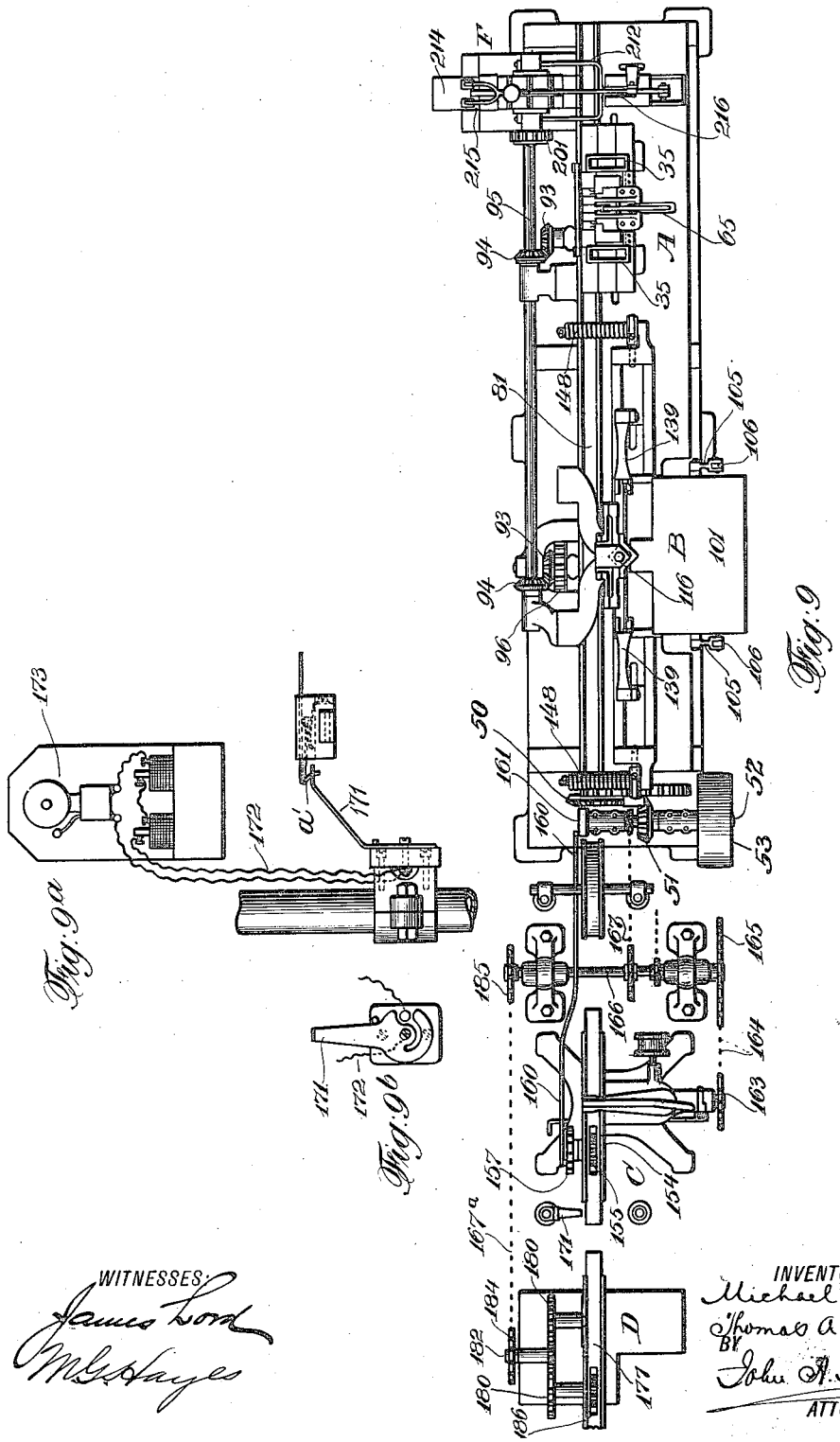

M. PARIDON & T. A. PALMER.
MACHINE FOR MAKING MATCH BOOKS.
APPLICATION FILED NOV. 9, 1907.
1,042,472.
Patented Oct. 29, 1912.
17 SHEETS—SHEET 5.
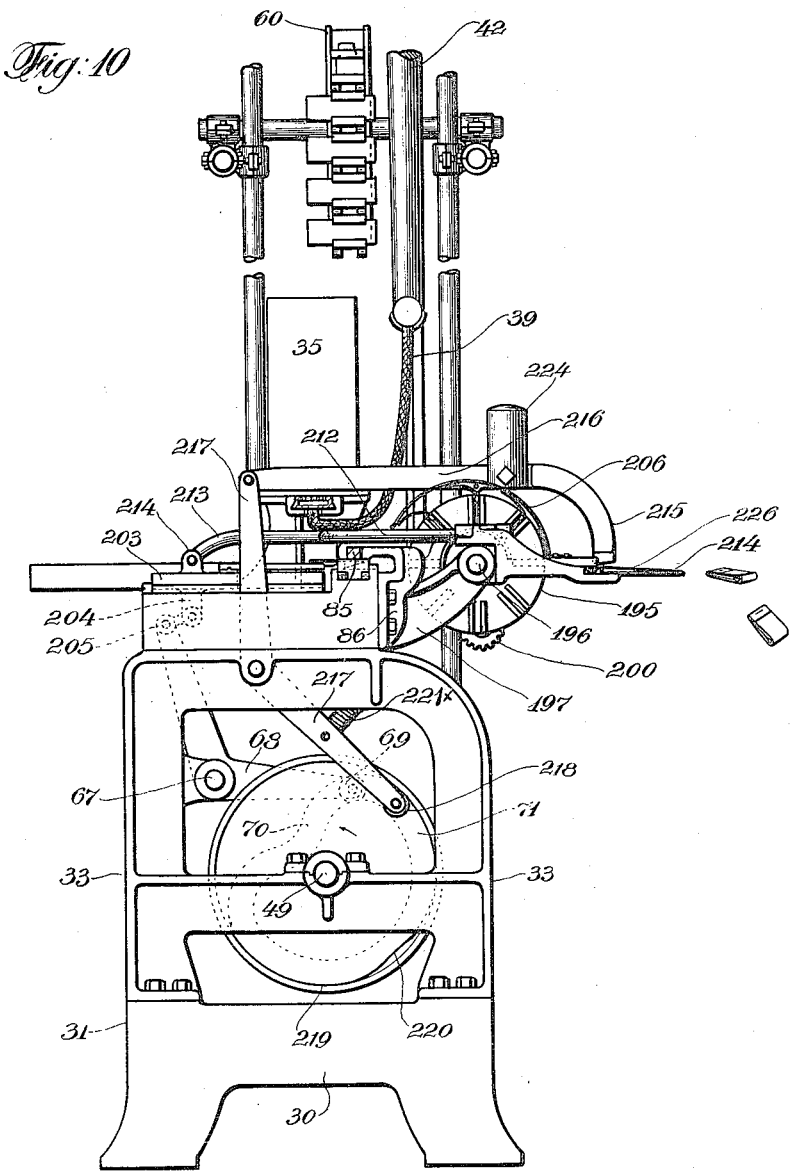

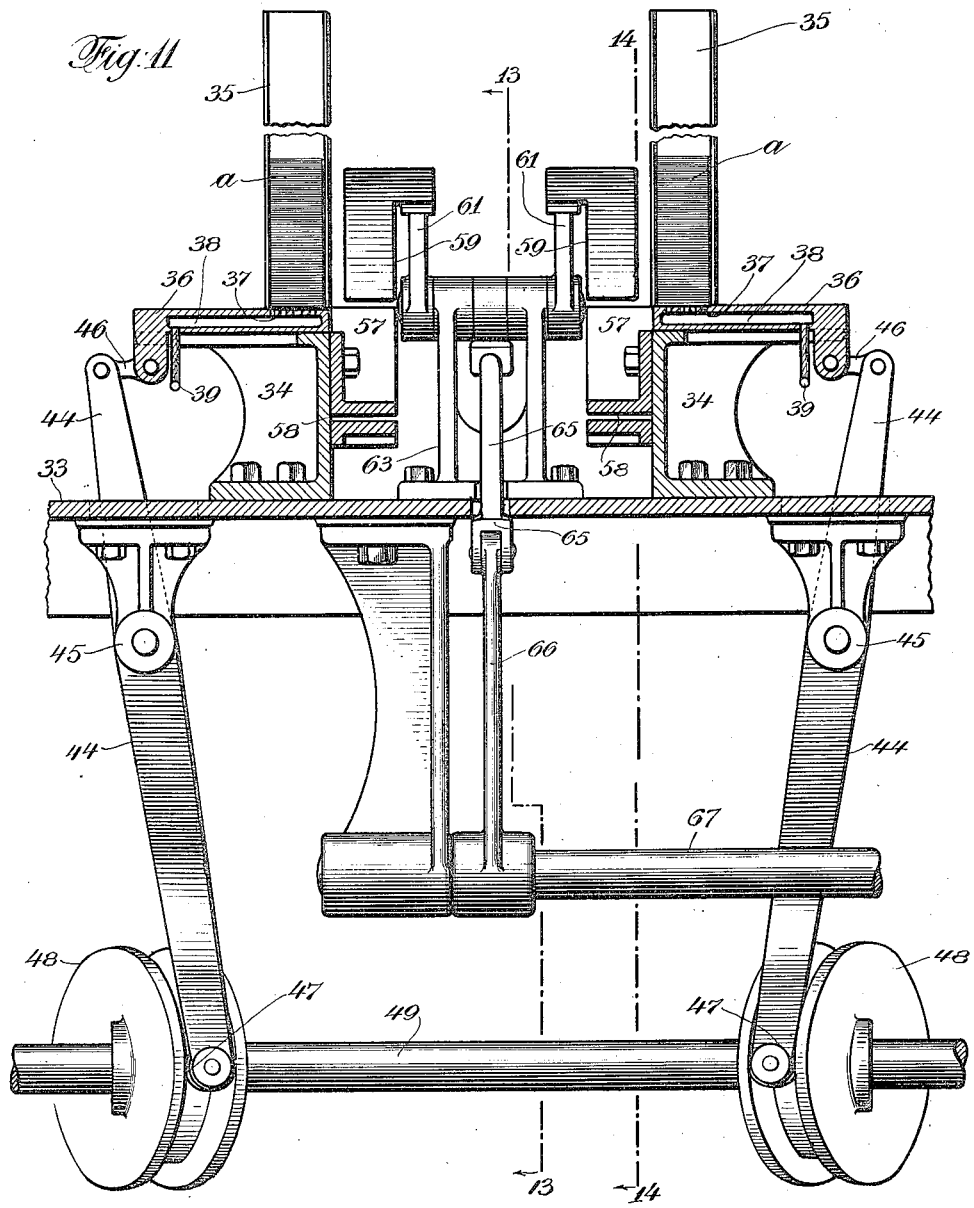

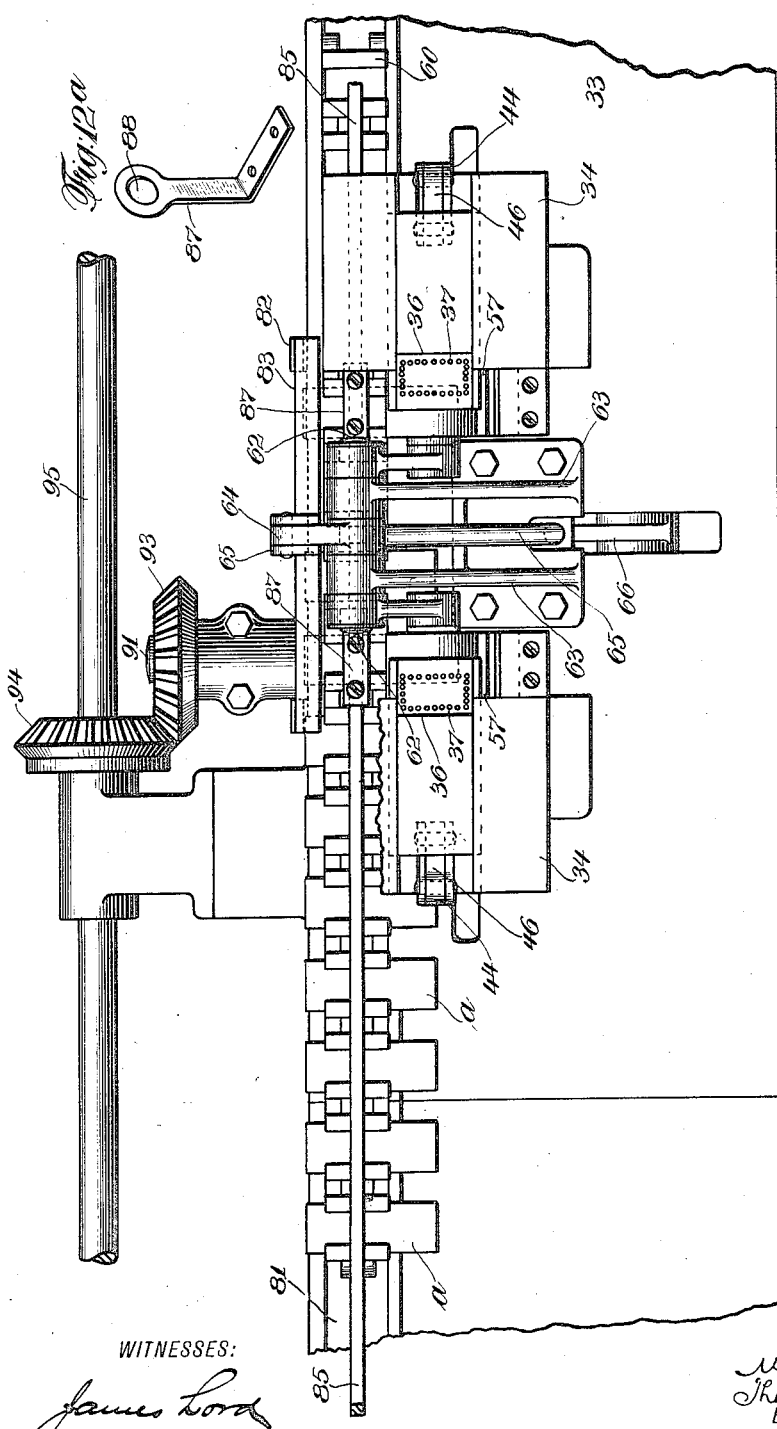

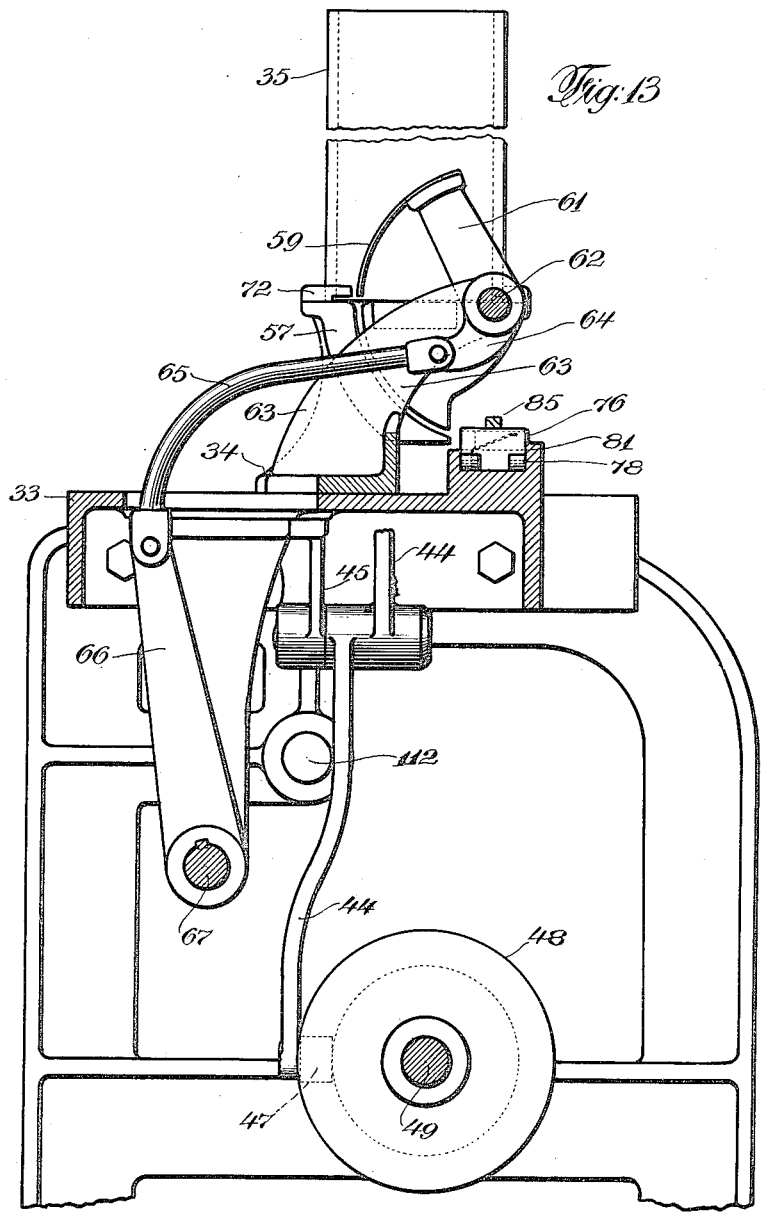

M. PARIDON & T. A. PALMER.
MACHINE FOR MAKING MATCH BOOKS.
APPLICATION FILED NOV. 9, 1907.

1,042,472.

Patented Oct. 29, 1912.

17 SHEETS—SHEET 9.

WITNESSES:
James Lord
M. G. Hayes

INVENTORS
Michael Paridon
Thomas A. Palmer
BY
John R. Nolan
ATTORNEY

M. PARIDON & T. A. PALMER.
MACHINE FOR MAKING MATCH BOOKS.
APPLICATION FILED NOV. 9, 1907.

1,042,472.

Patented Oct. 29, 1912.
17 SHEETS—SHEET 10.

WITNESSES:
James Lord
M. G. Hayes

INVENTORS
Michael Paridon
Thomas A. Palmer
BY John F. Nolan
ATTORNEY

M. PARIDON & T. A. PALMER.
MACHINE FOR MAKING MATCH BOOKS.
APPLICATION FILED NOV. 9, 1907.

1,042,472.

Patented Oct. 29, 1912.

17 SHEETS—SHEET 13.

WITNESSES:

INVENTORS
Michael Paridon
Thomas A. Palmer
BY John R. Nolan
ATTORNEY

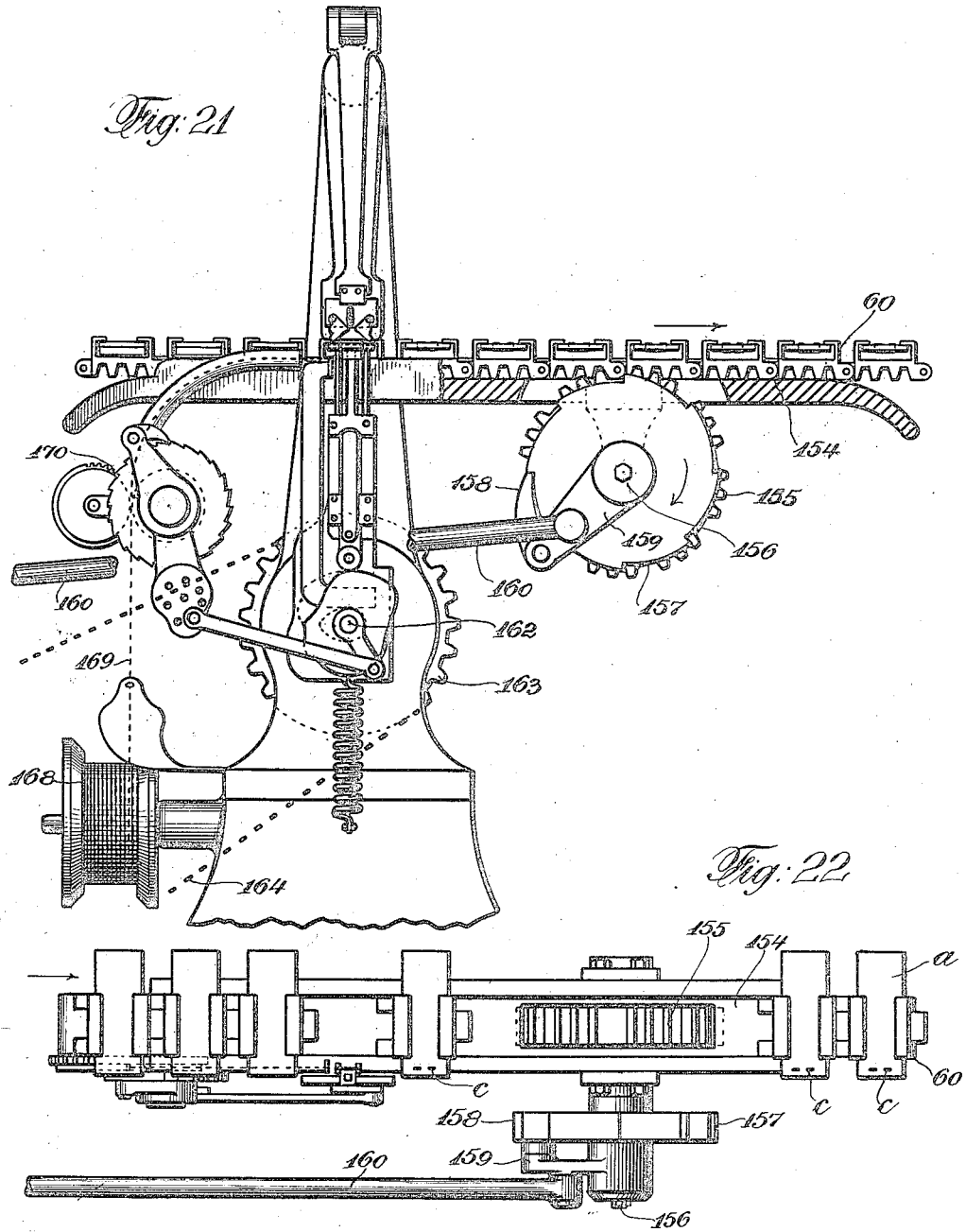

M. PARIDON & T. A. PALMER.
MACHINE FOR MAKING MATCH BOOKS.
APPLICATION FILED NOV. 9, 1907.
1,042,472.
Patented Oct. 29, 1912.
17 SHEETS—SHEET 15.
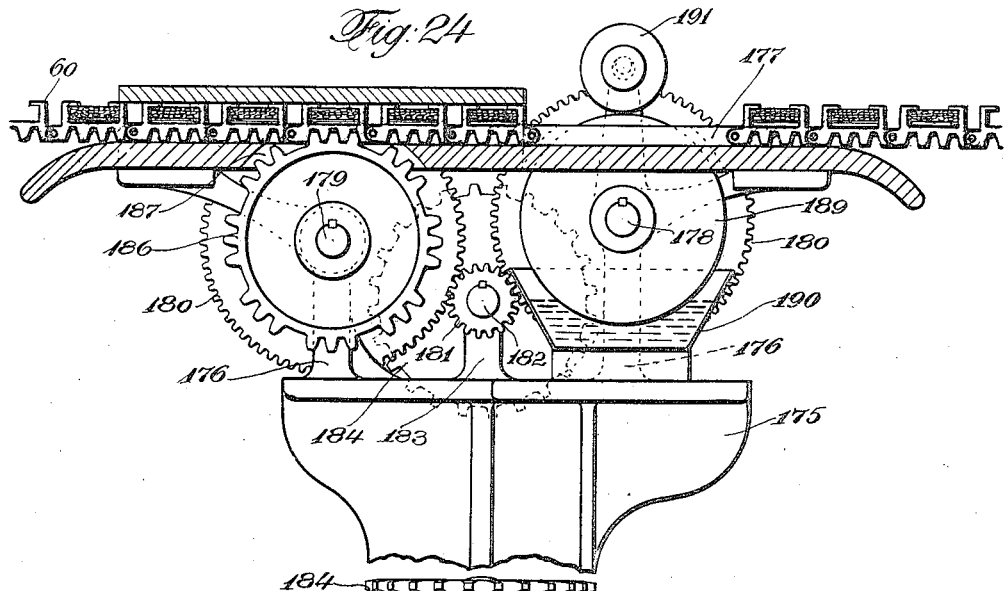
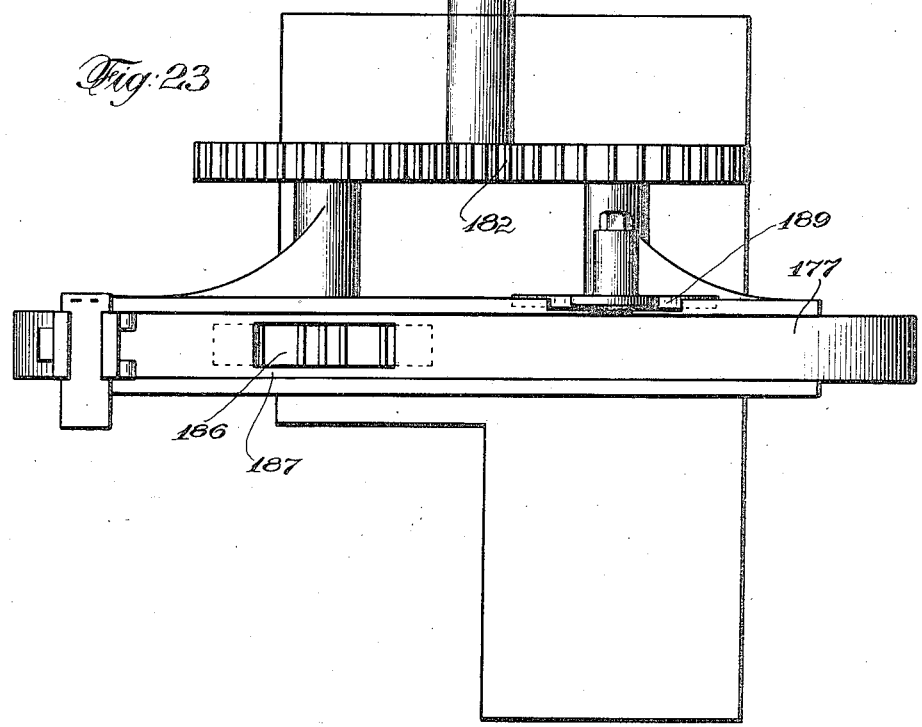
WITNESSES:
James Lord
M. G. Hayes
INVENTORS
Michael Paridon
Thomas A. Palmer,
BY
John F. Nolan
ATTORNEY M. PARIDON & T. A. PALMER.
MACHINE FOR MAKING MATCH BOOKS.
APPLICATION FILED NOV. 9, 1907.
1,042,472.
Patented Oct. 29, 1912.
17 SHEETS—SHEET 16.
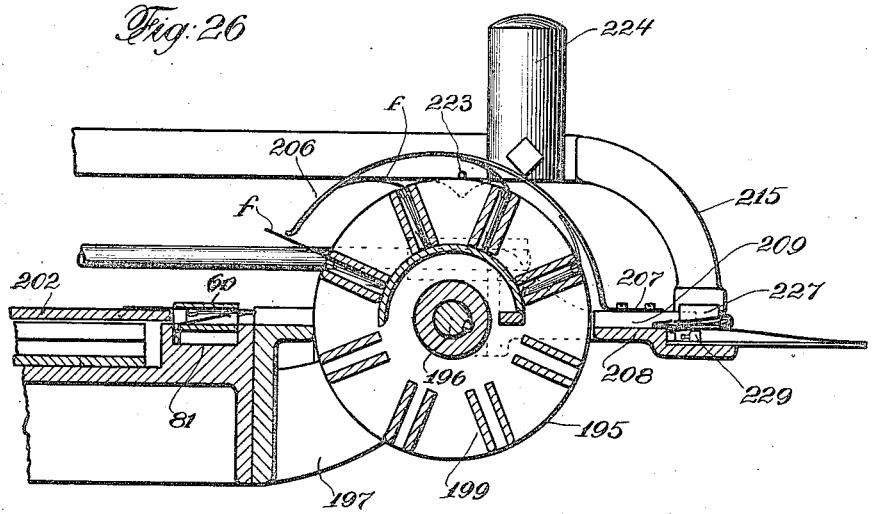
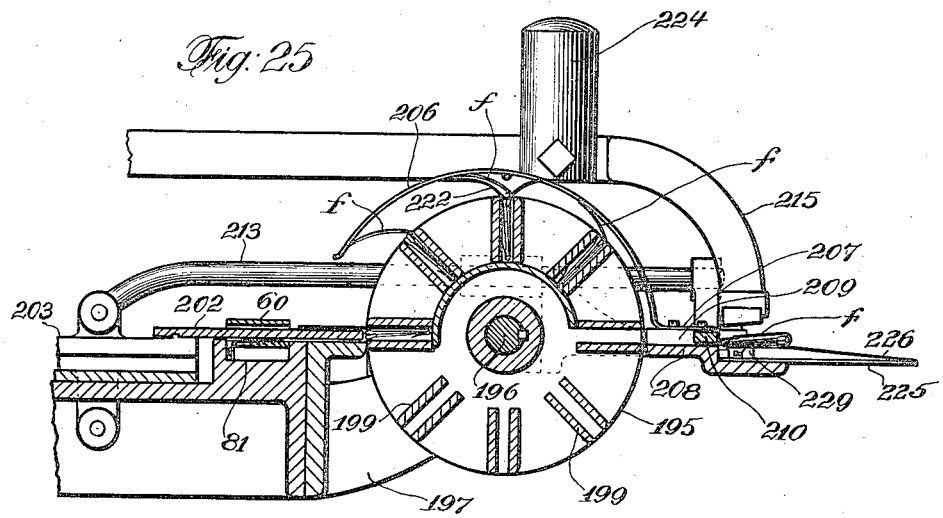

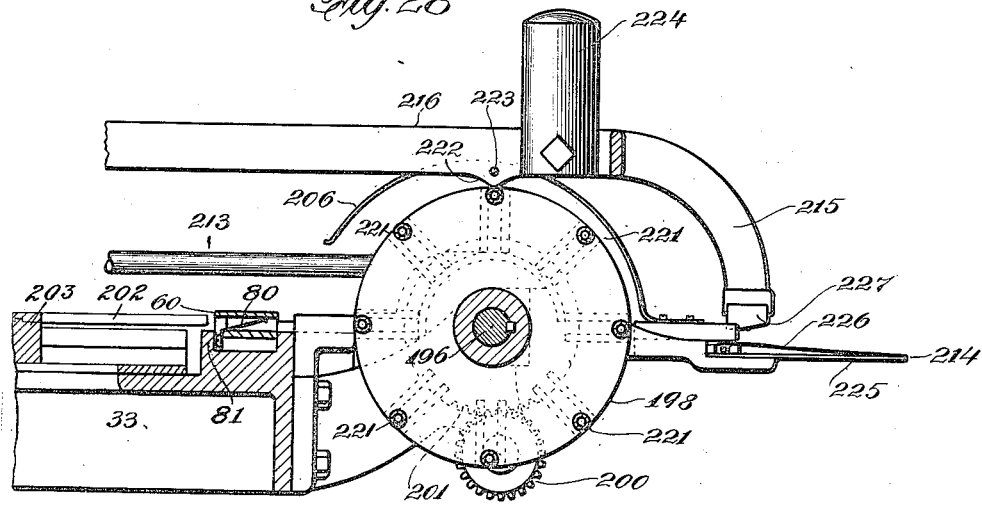
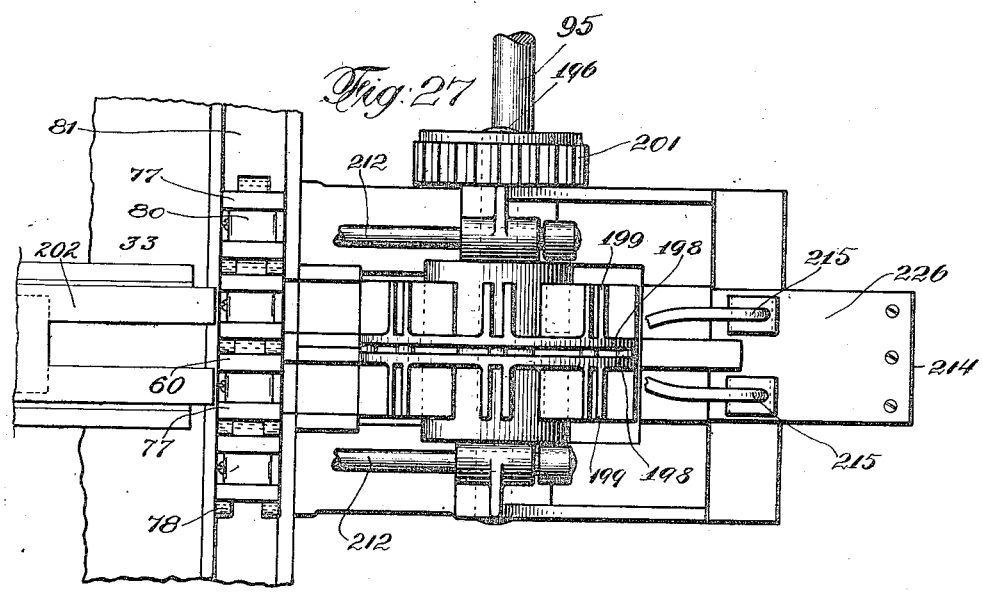
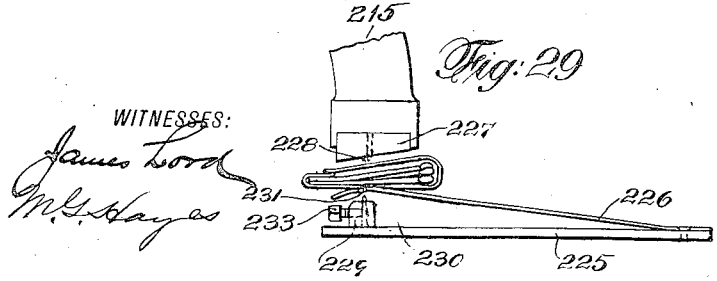

UNITED STATES PATENT OFFICE.

MICHAEL PARIDON, OF BARBERTON, AND THOMAS A. PALMER, OF AKRON, OHIO, ASSIGNORS TO THE DIAMOND MATCH COMPANY, OF CHICAGO, ILLINOIS, A CORPORATION OF ILLINOIS.

MACHINE FOR MAKING MATCH-BOOKS.

1,042,472.      Specification of Letters Patent.      Patented Oct. 29, 1912.

Application filed November 9, 1907. Serial No. 401,475.

*To all whom it may concern:*

Be it known that we, MICHAEL PARIDON and THOMAS A. PALMER, citizens of the United States, residing at Barberton and Akron, respectively, in the county of Summit and State of Ohio, have invented certain new and useful Improvements in Machines for Making Match-Books, of which the following is a specification.

This invention relates to machines for making that class of matches, termed "book-matches", wherein match cards are provided with a flexible cover to inclose and protect the same; having reference, more particularly, to mechanism for rapidly and efficiently applying the covers to the cards.

In the form of embodiment of our invention, which we have herein selected for illustration, mechanism is provided whereby the cover blanks are successively fed from a source of supply, folded at one end, and introduced to an endless carrier by means of which they are advanced to position to receive the match cards. Strips of previously prepared stock of a length comprising several match cards, are fed into the machine, and cards of proper length are severed from the strips. These cards are accurately positioned and pushed into the opposing folded ends of covers in the carrier. The carrier transports the cards and covers thus assembled to mechanism whereby they are fastened together; thence to devices whereby frictional igniting substance is applied exteriorly to the folds of the covers, thence through an extended drying path and back near to the cover magazine. At this point the cards, with their attached covers, are transferred from the carrier to devices whereby the outwardly-extending portions of the covers are turned over on the outer sides of the match cards and the free ends of the flaps thus formed are tucked in under the edges of the folds.

Our invention, stated in general terms, comprises simple, efficient and durable mechanisms whereby the various steps or operations above indicated are performed, including in their construction and organization novel and important features, all of which will be hereinafter particularly described and claimed.

Figure 14:
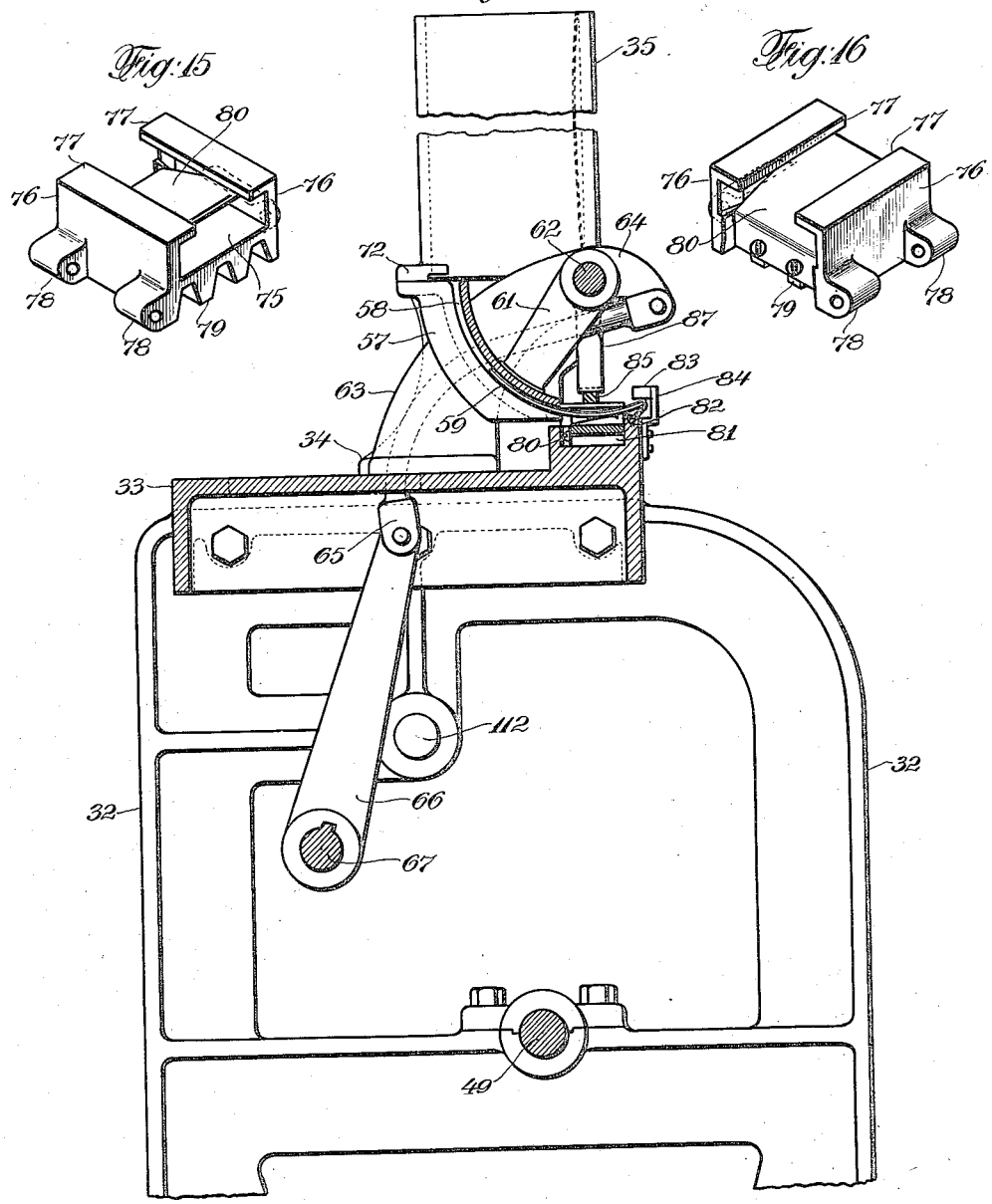
Figure 16:
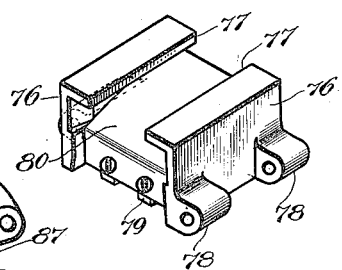
Figure 17:
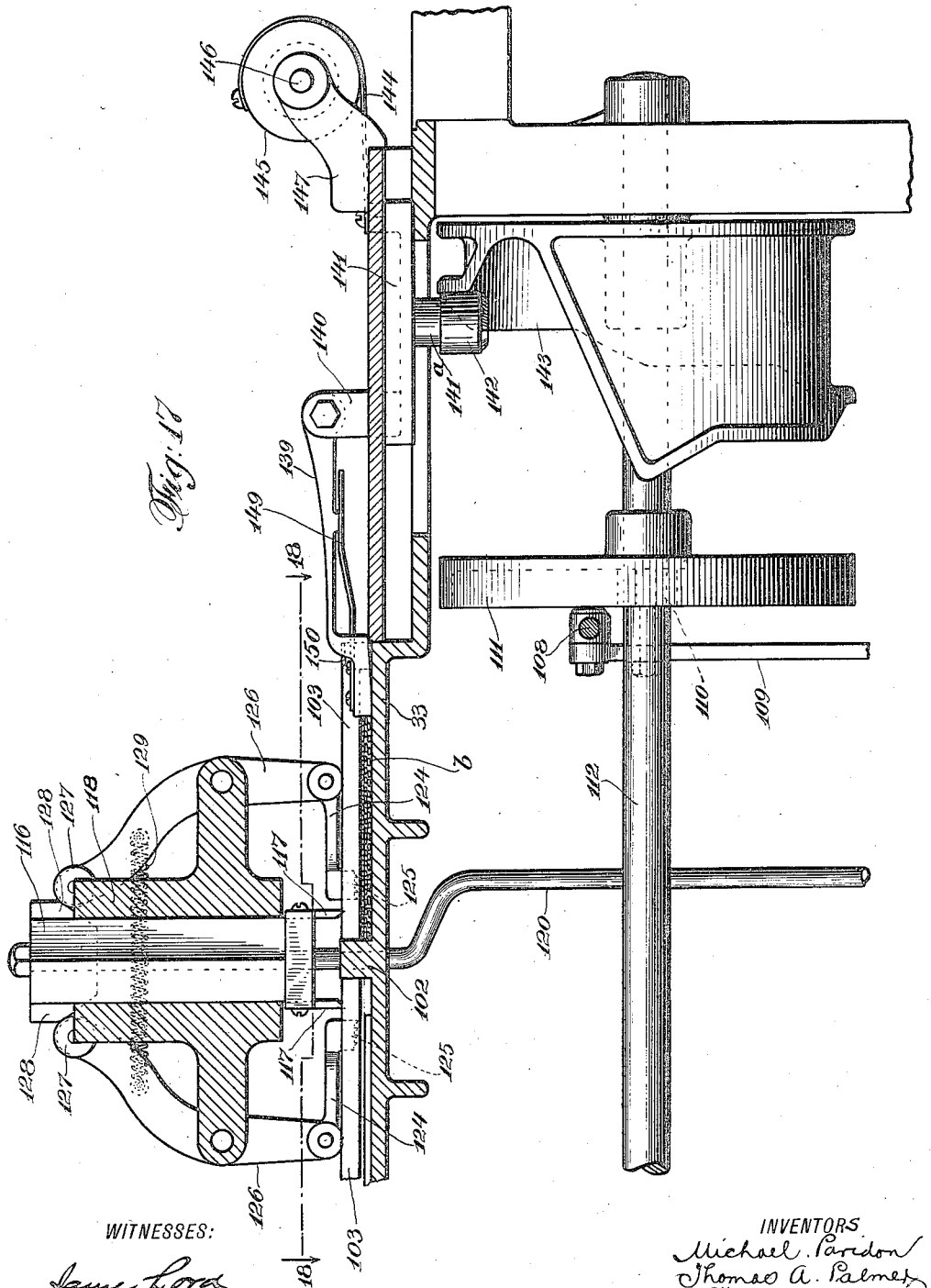
Figure 18:
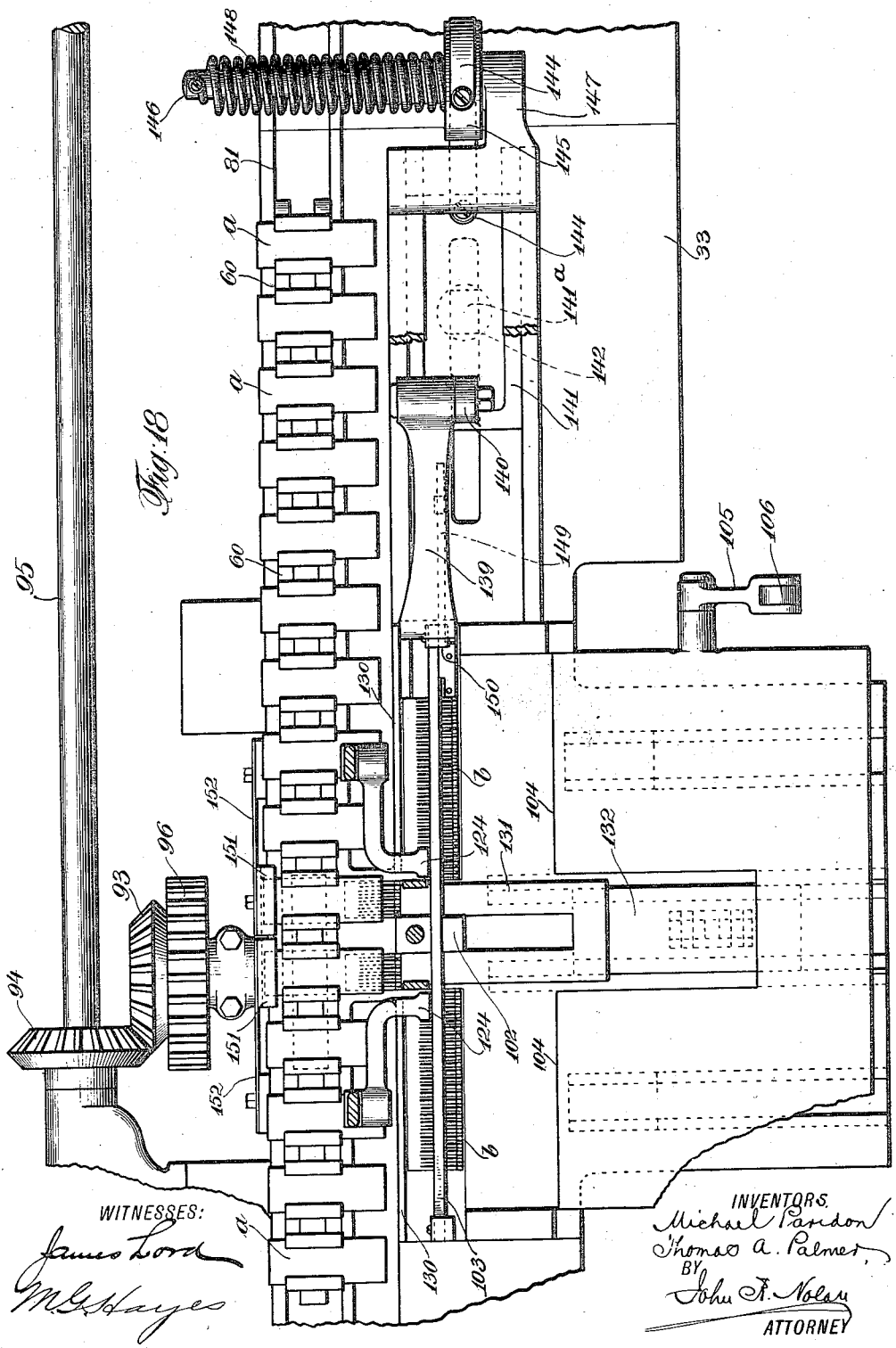
Figure 19:
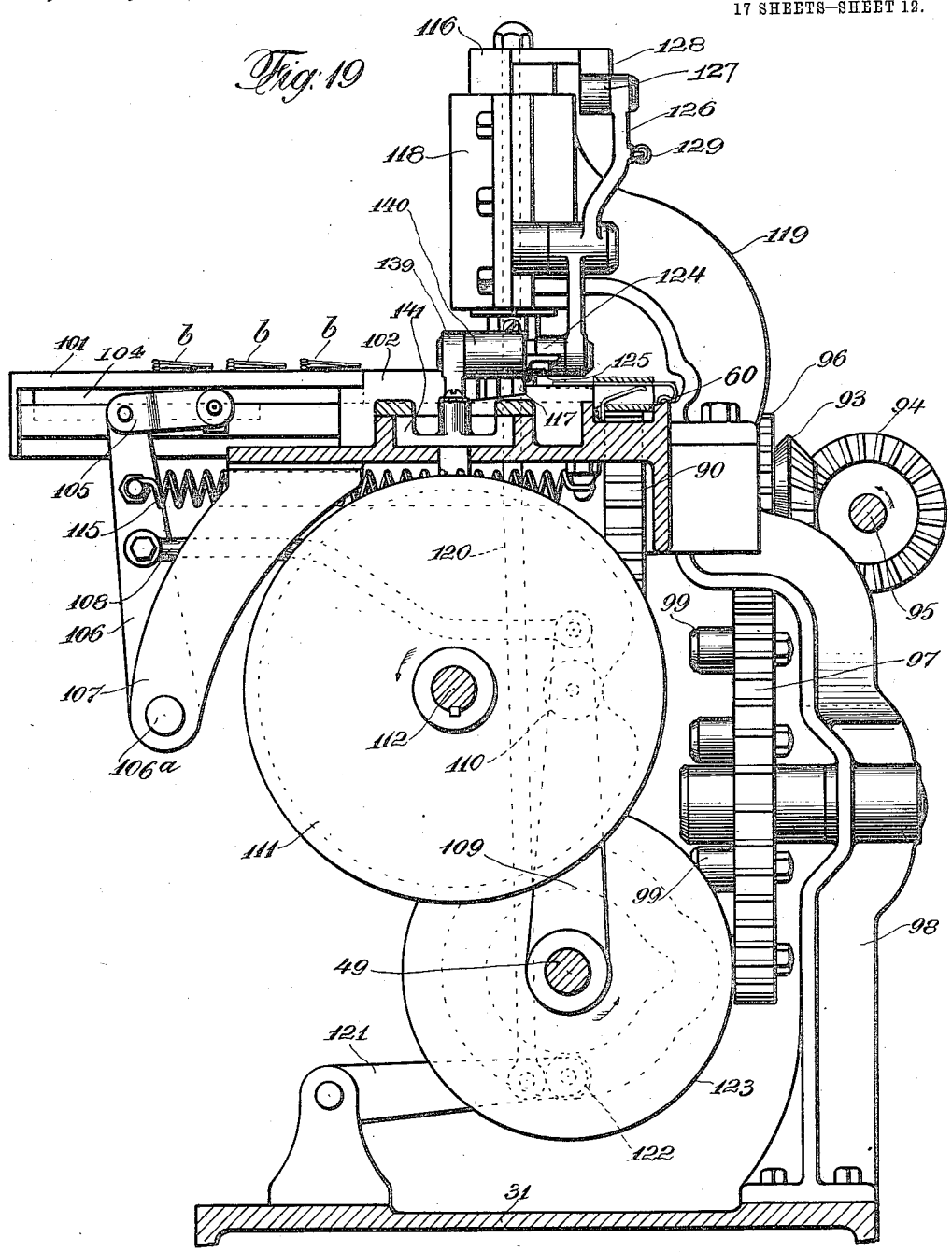
Figure 20:
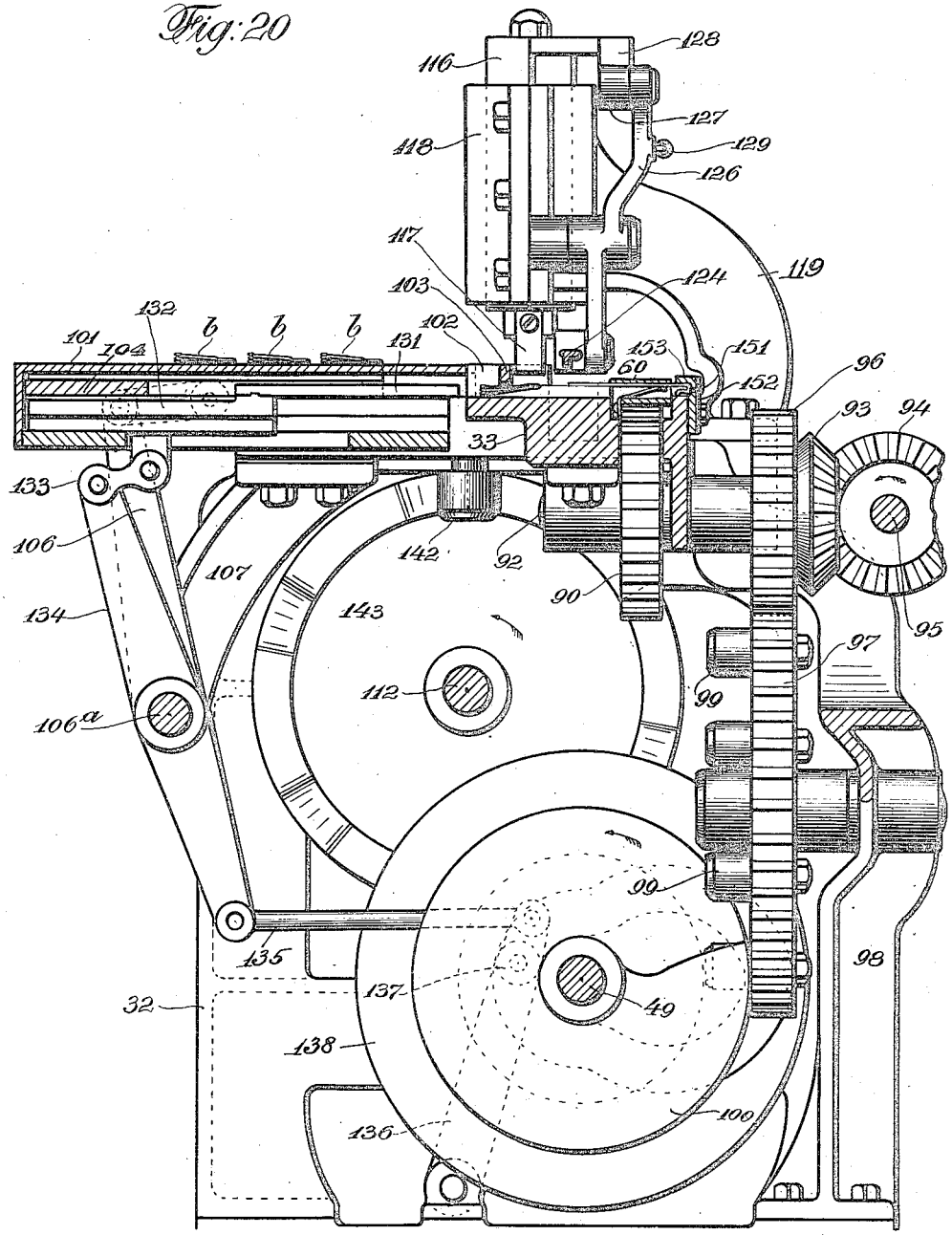

In the drawings—Figure 1 is a plan of a cover blank. Fig. 2 is a perspective view of a match strip adapted to be sub-divided into sections of proper length to form match cards. Fig. 3 is a similar view of a cover blank with its end folded to receive the marginal portions of match cards. Fig. 4 is a similar view showing the associated cards and cover stapled together. Fig. 5 is a similar view showing the end fold of the cover as provided with frictional igniting substance, and the flap of the cover as folded over upon the cards preparatory to being tucked into the end fold. Fig. 6 is a perspective view of the finished match book. Fig. 7 is a front elevation of a machine embodying our invention, a portion of the endless carrier being omitted. Fig. 8 is a rear elevation of the machine, with a part of the carrier also omitted. Fig. 9 is a plan of the machine, the carrier and its supporting structure being removed. Fig. 9$^a$ is a detail of electric connections which are actuated to sound an alarm upon failure of the stitching machine to operate; the circuit including a switch device which is adapted to be engaged by the unfastened fold of a book cover, as indicated. Fig. 9$^b$ is a front view of the said switch device. Fig. 10 is an elevation of the right-hand end of the machine. Fig. 11 is a longitudinal vertical section through the magazines for the cover blanks, the blank feeding slides and adjacent parts; showing the folding blades and other parts in elevation. Fig. 12 is a partial plan of Fig. 11, with the magazines removed, showing the parts in the position which they occupy when the folding blades are down. Fig. 12$^a$ is a detail of bracket hereinafter referred to. Fig. 13 is a transverse vertical section, as on the line 13 of Fig. 7. Fig. 14 is a similar section, as on the line 14 of Fig. 7, illustrating the folding blade in down position. Figs. 15 and 16 are perspective views, from opposite sides, of one of the links of the endless carrier. Fig. 17 is a longitudinal vertical section through the setting and cutting devices for the match strips, showing the action of one of the setting devices on superposed match strips. Fig. 18 is a horizontal section, as on the line 18 of Fig. 17. Fig. 19 is a transverse vertical section, as on the line 19 of Fig. 7. Fig. 20 is a similar section, as on the line 20 of Fig. 7. Fig. 21 is a side elevation, partly in section, of a portion of the stapling machine; showing the trackway and the actuating mechanism for the carrier. Fig. 22 is a partial plan of Fig. 21. Fig. 23 is a plan of the composition-applying section of the machine, only one link of the carrier being shown. Fig. 24 is a longitudinal vertical section of Fig. 23, showing several links of the carrier. Fig. 25 is a transverse vertical section through the final folding, tucking and ejecting devices, as on the line 26 of Fig. 7, showing the parts in the relative positions which they occupy immediately after a match book has been discharged from the pocketed wheel and preparatory to the action of the tucking finger upon the cover flap. Fig. 26 is a similar section showing the parts in the relative positions which they occupy during the action of the finger upon the cover flap. Fig. 27 is a partial plan of the said devices. Fig. 28 is a vertical section on a plane between the two parts of the pocketed flap folding wheel. Fig. 29 is a detail of the book supporting shelf and the overlying foot of one of the tucking fingers, the book being illustrated as resting upon the spring member of the shelf preparatory to the engagement of the finger with the cover flap.

Referring to the drawings—A is the station at which the rectangular cover blanks ($a$, Fig. 1) are successively removed from a source of supply, then one end of each blank is folded upon itself (as at $a'$, Fig. 3) and the blank or blanks thus folded are introduced to a carrier in an orderly manner.

B is the station at which previously-prepared strips of matches ($b$, Fig. 2) are fed to suitable cutting devices and positioned with respect thereto; then severed into appropriate lengths for cards, and the cards moved into the folded ends of the opposing covers which have been advanced by the carrier. C is the stitching mechanism to which the assembled cards and covers are next advanced by the carrier, and by which mechanism the associated cards and covers are united by staples (as $c$ Figs. 4, 5 and 6) or other appropriate fastening devices. D is the composition-applying mechanism to which the connected cards and covers are next advanced by the carrier, and by which mechanism frictional substance in liquid form is applied to the folded portions of the covers (as at $d$, Figs. 5 and 6).

E is the extended path about which the associated cards and covers are transported by the carrier in order to insure the drying of the frictional substance. F is the folding, tucking and ejecting mechanism to which the said cards and covers are brought by the carrier, at a point adjacent the source of supply of cover blanks, and by which mechanism the outwardly-extending portions of the blanks are folded down upon the match cards to constitute flaps (as at $f$ in Fig. 5); the free ends of such flaps then tucked under the first folded portions of the blanks, and the completed articles (as represented in Fig. 6) finally discharged from the machine.

We shall now particularly describe the above indicated mechanisms in the order just mentioned.

Referring to station A, Figs. 7 to 16, inclusive—30 designates a suitable supporting frame comprising a bed 31, standards 32, and a table 33. On this table, at or near the right-hand end thereof (as viewed from Fig. 7), are two brackets 34 upon which are supported two separate hoppers or magazines 35 within each of which is contained a stack of flat cover blanks. Mounted in horizontal guide ways in each of the brackets, and directly beneath the proximate hopper, is a slide 36 which constitutes the bottom of the hopper. The portion of the slide beneath the hopper is provided in its upper surface with a series of vertical perforations 37, which communicate with a chamber 38 within the slide. This chamber is connected at one end with a flexible tube 39 in communication with a suitable exhaust fan or pump 40 (Fig. 8), whereby air is exhausted from the chamber, and the lowermost blank in the hopper is thus held flat and in position upon the perforated portion of the slide. Hence by reciprocating the slide to move its perforated portion under and beyond the hopper, the lowermost cards are successively removed from the hopper. In the present instance the flexible tubes 39 are connected to a transversely-disposed branch pipe 41 on a main air-suction pipe 42 leading from the fan or pump; the branch pipe being conveniently supported by a post 43 rising from the main frame. The slides beneath the respective hoppers are simultaneously actuated to move a card from each of the hoppers. Any appropriate mechanism may be employed for actuating the slides. In the present instance a pair of vertical levers 44 are fulcrumed to depending brackets 45 on the table, the upper or shorter arms of the levers being pivotally connected with the respective slides by links 46, and the longer arms of the levers being provided with trunnion rollers 47 in engagement with the grooved peripheries of cams 48. (See Fig. 11.) These cams are carried by a longitudinally disposed shaft 49 which is mounted in suitable bearings in the main frame. One end of this shaft is provided with a bevel gear 50 which meshes with a gear 51 on a transversely disposed drive shaft 52 mounted in pedestals on the bed. The shaft 52 is provided with a pulley 53 which is connected by means of a belt 54 with a pulley 55 on an overhead line shaft 56. (Figs. 7 and 8.)

On the inner side of each of the brackets is bolted a segmental member 57 (Figs. 11, 12, 13 and 14) of a width somewhat greater than that of a cover blank. In this member is formed from top to bottom a curved passage 58, the outer side of which is open, and its top is directly below one end of the blank withdrawn from the hopper by the suction plate.

A curved blade 59 corresponding with the passage is adapted to be swung into and from the same. This blade in its downward stroke engages the opposing end portion of the blank, and tucks it down into the passage, thereby effecting the folding of such end, carrying the blank bodily through the curved passage and setting the fold within a link of the endless carrier 60 hereinafter described.

The blade is borne by an arm 61 which is mounted on a rock-shaft 62 that has its bearing in brackets 63 rising from the table. The arms for the two blades are carried by this shaft so as to operate concurrently. On the shaft is an arm 64 which is connected by means of a link 65 with an arm 66 rising from a rock-shaft 67 below the table. On this shaft 67 is a lever 68, one arm of which carries a roller 69 which engages a cam way 70 of a cam wheel 71 o the shaft 49, and is thereby actuated to effect the timely operation of the rock-shaft 67. (See Fig. 10.) The other arm of this lever is operatively connected with certain discharging devices which will presently be e lained.

It is to be noted that the construction and organization of the parts just described are such that when the folding blades are in up position, the slides are pushed forward to carry the cover blanks directly under the blades. The blades then descend upon the blanks. The slides remain at rest for an instant after this operation, and then move back toward the hoppers. When they (the slides) are about half way back the folding blades have reached their extreme down position (as in Fig. 14). In the next or return stroke of the blades the slides continue back to their original position under the hoppers in readiness to push forward the next succeeding cover blanks.

Upon each of the folding members 57 is affixed an overhanging piece 72 (Figs. 13 and 14) under which extends that end of the cover blank to be folded. This piece not only insures the guidance of that end of the blank directly above the curved slot 58, but it performs the important function of engaging and slightly turning up the extreme edge of such end (as indicated at $a^2$, Fig. 3,) in order to facilitate the entrance thereunder of the end of the flap of the cover in the final operation of the machine.

The carrier previously referred to comprises links of novel construction hingedly connected in the form of an endless chain which is supported and guided at various points throughout its course by guide wheels 73 which are suitably mounted upon appropriate frame work 74. The preferred construction of the individual links is clearly seen in Figs. 15 and 16.

Each link comprises a bottom 75 having upwardly projecting end walls 76 with overhanging top flanges 77. The ends are provided with ears 78 by means of which the contiguous links are hingedly connected by transversely extending pivot pins; and the under side of the bottom of each link is provided with gear teeth 79 with which engage driving gear wheels at various points in the course of the carrier. Within the link is arranged a flat spring plate 80 which inclines from the forward side edge of the bottom 75 to and against the under side of the top flanges 77 near the opposite side of the link. The lower edge of this plate is conveniently affixed to the side of the link, so that the upper or free end bears yieldingly against the flanges.

On the top of the table, at or near the rearward edge thereof, is a longitudinal way or channel 81 within which the chain is seated and guided, the links extending above the walls of such way or channel and into the horizontal plane of the swinging blades when the latter have swung out of the lower ends of the curved passages. (Figs. 13 and 14.)

The carrier is impelled intermittently, and in each dwell thereof two of the links are at the lower ends of the respective passages. At this juncture the blades carry the folded ends of the covers through the opposing links, that is, between the spring plates and the flanges, said plates yielding to permit the free passage of the blades and covers. The folded ends of the covers are carried beyond the outer sides of the links so as to rest upon the outer wall of the guideway, as indicated in Fig. 14. The blades are then swung upward, and the spring plates perforce clamp the lateral edges of the covers against the overhanging flanges of the links. A shoulder 82 at the inner portion of the guide wall affords a stop or abutment for the folded edges of the covers to prevent their return with the blades. The carrier is again advanced to present a pair of empty links to the folder passages for the reception of successively folded blanks. This operation is repeated during each step of the carrier, and the folded covers are progressively conveyed to and across the station where the match cards are applied thereto.

An overhanging stop bar 83 supported by a bracket 84 on the rear side of the table, directly opposite the folding devices, engages the folded ends of the blanks and keeps them from straightening out when they are projected through the carrier by the folding blades. (See Figs. 14 and 18.) Extending along the table immediately above and parallel with the carrier, is a bar 85 which serves to hold the carrier chain uniformly down within the guide way or channel of the table. This bar is supported at intervals by brackets 86 (Fig. 10) which are bolted to the table. To brace the bar, and reduce vibration, at the folding devices, angular brackets 87 provided with eyes 88 are slipped over the ends of the folder shaft 62 and fastened rigidly to the bar. (See Figs. 12, 12ᵃ and 14.)

It is to be noted that unfolded portions of the covers extend outwardly beyond the inner or entrance sides of the links, and that the outer open sides of the passages in the folding members 57 permit the unobstructed advance of such portions with the carrier.

The intermittent movement of the links along the table is effected by pinions 89, 90, which mesh with the gear teeth on the under sides of the links. These pinions are carried by shafts 91, 92, respectively, which are mounted transversely of the table in suitable bearings. One end of these shafts extends beyond the rear of the table and carries a bevel wheel 93 which meshes with a similar wheel 94 on a longitudinally disposed shaft 95. The pinion 89 is arranged adjacent the cover receiving station just described, and the other pinion 90 is arranged at or near the card applying station. On the shaft 92 of the pinion 90 is a pinion 96 which meshes with a spur gear 97 mounted on a stud shaft on a standard 98 of the main frame. On the inner face of this gear are mounted a series of spaced pins 99 with which successively engages a spiral cam 100 on the driven shaft 49 previously mentioned, whereby the said gear 97 is intermittently rotated, and the requisite movements thence transmitted to the carrier through the intermediate gearing. (See Figs. 7, 8, 9, 19 and 20.)

Referring to station B, Figs. 7, 8, 9, 18, 19 and 20, 101 represents a feed table upon which match strips (b) are deposited by an attendant, and manually fed to the main table. In the production of each of the match books herein illustrated, two superposed cards are employed, and hence two strips placed one upon another are fed to the main table. Two of these double strips, slightly separated endwise from each other, are disposed on the feed table and thus fed into the machine. A transverse wall or partition 102 on the main table insures separation of the strips endwise from each other, and affords end stops or guides therefor. (See Fig. 17.)

Supported slightly above the table is a longitudinally-disposed bar 103 under which the strips are forced preparatory to the severance of match card lengths therefrom, this bar serving as a guard to hold the strips in position. The strips are forced under the guard by means of a reciprocable slide 104 which is mounted within the feed table so as to abut at its forward edge against the outer ends of the opposing strips. This slide is connected at its respective ends by means of links 105 with two arms 106, which are carried by a rock shaft 106ᵃ having its bearings in brackets 107 depending from the main table. One of the arms is connected by means of a link 108 with a rock-arm 109 which is loosely mounted on the driven shaft 49. On this arm is a roller 110 which engages a face cam 111 on a longitudinal shaft 112 beneath the main table. This shaft 112 is driven from the shaft 49 through co-acting gear wheels 113, 114 on the respective shafts. The slide 104 is held yieldingly in its inner position by means of a spring 115, (Fig. 19) which is secured to one of the arms 106, and to the table; and the contour of the cam 111 is such that at the proper period the slide is retracted thereby, and then permitted to return to its inner position by the action of the spring.

The means for severing the match cards from the strips is preferably of the following character (Figs. 7, 8, 9, 17, 19 and 20): 116 is a vertically reciprocating head carrying on its lower end two depending cutter blades 117. This head is slidingly mounted in a guide frame 118 carried by a post or bracket 119 rising from the main frame; and a rod or link 120 connects said head with a rock arm 121 which is pivoted to a bracket on the bed plate. The free end of this arm carries a roller 122 which enters the cam groove of a face cam 123 on the driven shaft 49; the groove being appropriately formed to effect the timely vertical actuation of the cutter head. (See Figs. 17 and 19.)

The cutters are so spaced with relation to the partition 102, that the distance between the functional edge of each cutter and the adjacent vertical side of the partition is equal to the width of a match card; and the width and location of the cutters are such that in their descent they simply sever the margins of the card strips previously positioned thereunder by the slide 104.

In order to insure the uniform contact of the ends of the strips against the opposing sides of the partition 102, a pair of longitudinally reciprocable feed dogs 124 are mounted and arranged to rest yieldingly—preferably by gravity—upon the strips and act to press them into place immediately before the operation of the cutters. These dogs comprise fingers which are provided at their acting ends with serrated portions 125 to insure their engagement with the splints of the strips, which portions, as will be observed, lie slightly beyond the outer sides of the cutter blades. The opposite ends of the fingers are pivoted to the lower arms of vertical levers 126 which are fulcrumed on projections of the guide frame 118 for the cutter head. The upper arms of the levers 126 are curved inwardly and provided with rollers 127 which are held in yielding contact with beveled or cam portions 128 on the cutter head by means of a spring 129 connecting the two arms. (See Fig. 17.) In the descent of the cutter head the upper arms of the levers are forced slightly outward by the cams 128, thereby moving the dogs inward toward the stops, with the result stated. When the cutter head ascends, the dogs resume their normal or retracted position for a succeeding operation. In order that the entire weight of the dogs shall not rest upon the match strips, the dogs are so formed that a portion thereof behind the teeth rests upon a suitably-disposed guide bar 130 on the main table. (See Fig. 18.)

When the cards have been severed from the strips, the cards are pushed rearwardly in a manner to enter the opposing links in which the covers are clamped, the spring plates 80 yielding to permit the passage of the cards into and through the links. The marginal ends of the cards are pushed entirely through the links and into the opposing end portions of the covers. A simple and efficient means for thus advancing the cards to the covers comprises a bifurcated slide 131 which is reciprocative transversely of the main table. This slide is connected to a slide plate 132 mounted within the feed table. A depending lug on the plate 132 is jointed through a link 133 with the upper arm of a lever 134 that is loosely mounted on the rock-shaft 106ª, the lower arm of the lever being connected by means of a link 135 with a rock-arm 136 which is pivoted to a lug on the bed-plate. On this rock-arm is a roller 137 which engages a face cam 138 on the shaft 49, the contour of the cam groove being such as to effect the timely reciprocation of the slide for the purpose stated. (See Fig. 20.) Upon the retraction of the slide, and before the succeeding descent of the cutter head, the match strips are advanced longitudinally to the end stops in order to present another portion of each strip to the action of the cutters. For this purpose are employed a pair of reciprocating push arms 139, Figs. 7, 8, 9, 17 and 18. These arms are actuated longitudinally of the table so as to bear against the outer ends of the match strips and advance them toward the stops. The forward or acting ends of these arms rest upon the table, their opposite ends being pivoted to lugs 140 on slide plates 141 which are guided in ways on the table. (See Fig. 18.) Depending from each of the slide plates, and through a longitudinal slot in the table, is a stud 141ª carrying a roller 142 which is held in contact with the face of a cam 143 on the shaft 49; the contour of the cam being such that during each revolution thereof periodical progressive inward movements of the slide 141 corresponding with the number of cards to be cut from the strip are effected. A flexible band 144 is connected with the outer end of the slide plate, and with the periphery of a roller 145 whose shaft 146 is journaled in a bracket 147 on the table. On this shaft is a spring 148, one end of which is secured to the shaft and the other end to the wheel 145, whereby when the said wheel is rotated through the inward movement of the slide, the spring is wound upon the shaft, and the torsional action incident thereto tends to maintain the slide retracted and in contact with the cam 143.

The cam is so constructed that during its rotation the push arm 139 is advanced thereby against the action of the spring a distance equal to the width of a match card, and there maintained not only until the card has been severed from the strip and introduced to the cover, but until the bifurcated slide 131 has been retracted, whereupon the said push arm is again advanced by the cam a distance equal to the width of a match card and retained in place as before, and so on until the strip has been finally severed. This done, the torsional spring and connections return the slide 141 and its appurtenances for a succeeding operation. To maintain the acting part of the push arm positively in contact with the table, and so insure its abutment against the end of the match strip, we affix to such portion one end of a bent strip 149 and provide on the outer end of the guard bar 103 a stud or projection 150 which overhangs the strip and engages therewith. (See Figs. 17 and 18.)

We preferably provide at the rear of the table a pair of suitably located stops 151, (Figs. 18 and 20) which afford abutments for folded portions of the covers during the insertion of the match cards therein. These stops comprise separate blocks carried by flat springs 152 which are bolted to the table; the upper portions of the blocks having each a lip or flange 153 which overhangs the adjacent wall of the carrier channel and the folded cover portion thereon. The blocks, by virtue of their spring connections, have capacity for independent outward movement so as to relieve any undue pressure which would otherwise result from unevenness in the length of the match cards when they are being forced into the cover by the forked push slide 131.

It is to be noted that the outwardly projecting portions of the covers travel on a plane immediately above the path of the slide 131, the rigidity of the material maintaining such portions in raised position to permit the slide to pass freely under the same. Of course, if thinner or less rigid material for the covers be employed, a metal strip can be easily arranged in proximity to the slide to underlie such projecting portions and support them in raised position.

After each set of match cards has been introduced to the carrier and associated with the covers, the carrier is advanced to bring another pair of links containing covers to the path of the card inserting devices, and so on continuously.

The mechanism for binding the cards and their covers requires no detailed illustration or description. For this purpose we employ an ordinary wire stitching machine indicated at C, by means of which staples (c) are formed from wire, driven through the sheets or cards from one side thereof and clenched on the reverse side. (See Figs. 7, 8, 9, 21 and 22.) We provide this stitching machine with a guide way 154, for the carrier, whereby the folded ends of the covers with the interposed marginal portions of the cards are directed successively into position to be stapled.

The carrier is fed intermittently along the guide way by means of a gear wheel 155 in mesh with the rack teeth of the carrier; the shaft 156 of the wheel being journaled in brackets depending from the guide way. On this shaft is a ratchet wheel 157 with the teeth of which engages a pawl 158 carried by an arm 159 loosely hung on the shaft. The arm is connected by means of a rod 160 with a crank 161 on the main drive shaft 52 and thereby positively actuated.

The drive shaft 162 of the stitching mechanism bears a sprocket wheel 163 which is connected by means of a chain 164 with a sprocket wheel 165 on a counter shaft 166 which is geared with the main drive shaft through sprocket connections 167. In the drawings are illustrated the wire reel 168, the wire 169 directed therefrom to the staple forming, driving and clenching devices, and also the wire feeding devices 170, these parts being very generally indicated as they are of usual and well known construction. It is sufficient to observe that the gearing is timed to insure harmonious operations of the mechanisms.

Just in rear of the stitching mechanism is mounted on one of the posts of the general frame structure, a pivoted switch lever 171 designed to control an electric circuit 172 within which is included an electric bell 173, or other alarm, either aural or visual. See Figs. 9, 9$^a$ and 9$^b$. One arm of this lever extends to a point immediately below the outwardly projecting end of the cover as it leaves the stitcher. Here the folded end of the cover is unsupported by the side of the trackway, and hence if the parts have been stapled together the fold will lie above and clear the switch arm; but if, on the other hand, the fold be unfastened, it will spring down into the path of and abut against said arm, thereby partially turning the switch and completing the electric circuit. (See Fig. 9$^a$). An alarm or signal will thus be immediately given to the operator.

The cards and covers as united by the stitching mechanism are carried across the path of the composition applying mechanism D which applies the frictional igniting substance to the end folds of the covers during their traverse.

Referring to this mechanism, D,—which is most clearly shown in Figs. 7, 8, 9, 23 and 24,—175 is a standard or frame provided with spaced posts or brackets 176 upon which is supported a trackway 177 for the carrier, the sides of the trackway lying slightly below the horizontal path of the projecting end portions of the cover so as not to interfere with the travel of the latter. In these posts are journaled shafts 178, 179, carrying spur wheels 180 in mesh with an interposed pinion 181. The shaft 182 of this pinion is journaled in a bearing 183 on the standard and is provided with a sprocket wheel 184, which is connected with and driven from a similar wheel 185 on the counter shaft 166 by means of a chain 167$^a$. (See Figs. 7 and 8). On the shaft 179 is a gear wheel 186 which extends through an opening 187 on the floor of the trackway and meshes with the teeth of the carrier, thereby impelling the latter continuously. In order to compensate for the change from intermittent to continuous motion of the carrier, a slackness therein is provided between the stitching and composition-applying mechanisms, as indicated at 188, Figs. 7 and 8. On the shaft 178 is a wheel 189 which turns in an underlying composition containing vessel 190 sustained on the standard. This wheel extends through a slot or recess in the side of the trackway so that the periphery of the wheel runs in the path of the fold of the cover and thereby uniformly applies to the opposing surface of the fold the frictional composition contained in the vessel. A wheel 191 loosely mounted in an upward extension of the bracket 176, just above the wheel 189, serves to maintain the folded end of the cover effectively in contact with the latter wheel.

As previously stated, the covers, when they have been provided with the frictional composition, are impelled by the carrier through an extended path (E) to insure the drying of the composition, guide wheels 73 being provided at various points to support and direct the carrier throughout its course of travel.

At convenient intervals, auxiliary gear wheels 192 are arranged to engage the teeth of the carrier. The shafts of the wheels are journaled in bearings in the frame work and are provided with sprocket wheels 193 which are connected by means of chains 194 with wheels on the counter shaft 166. (See Figs. 7 and 8.)

When the carrier has almost completed its cycle of movement, the united cards and covers reach the final folding, tucking and ejecting mechanism F. Referring to this mechanism, F,—which is most clearly shown in Figs. 7, 8, 9, 10, 25, 26 and 28—195 is a wheel carried by a shaft 196 having its bearings in rearwardly extending arms 197 on the main frame. This wheel is composed of two slightly separated disks 198, provided each on its outer face with corresponding pairs of wings or jaws 199, which constitute radial pockets proportioned to receive and carry the united covers and cards. These pockets, of which, in the present instance, there are eight in each part of the wheel, are arranged at equal distances apart, and the wheel is intermittently rotated correspondingly with the intermittent travel of the carrier so as to bring two adjacent pockets directly in front of two links of the carrier during each operation of the pocketed wheel and the carrier. The timely operation of the wheel is effected by means of the intermittently rotatable shaft 95, through a pinion 200 thereon in mesh with a spur wheel 201 on the shaft of the pocketed wheel.

The united covers and cards are pushed from the two links of the carrier into the opposing pockets of the wheel 195 by means of a bifurcated plunger 202, which is carried by a transverse slide or head 203 on the main frame. This slide is provided with a depending lug 204 which is connected by means of a link 205 with the upper arm of the rock lever 68 which is actuated by the cam 70 previously described; the operation of the lever being such that the reciprocation of the slide and plunger is effected thereby while the chain and wheel are at rest. The plunger in its inward stroke bears against the heads of the matches, the outwardly extending portions of the two covers overhanging the plunger. These portions of the cover are not inserted in the pockets, but extend outwardly of the wheel and are carried around therewith in its continued rotation.

Adjacent the upper portion of each part of the wheel is a substantially semi-circular strip 206, which is arranged eccentrically to the wheel as shown, its rearward end being disposed nearer than its forward end to the path of the pockets, and being provided with a rearward horizontal extension 207 which is secured to a ledge 208 on the main frame so as to overlie a channel 209 in the latter. This channel is in alinement with a pocket of the wheel when the latter is at rest. The forward or free end of the strip 206 lies some distance above the plunger and the projecting ends (f) of the covers, and hence such ends, during the rotation of the wheel, are intercepted by the strip and gradually folded thereby over upon the outer walls of the adjacent pockets. When the book, with its cover thus folded reaches a position in front of the channel 209 the book is bodily ejected from the pocket by means of a horizontally-reciprocating bar 210 which is movable into and through the pocket and into the channel 209. There are two bars, 210, one for each part of the wheel, and these bars are supported at their outer ends by brackets 211 depending from the respective branches of a Y-frame 212 which is guided in bearings on the main frame. The stem 213 of the frame 212 is pivoted to a lug 214 on the slide 203 so as to partake of the movements of the latter, and hence, during each stroke of the plunger to insert two books with open covers into the pockets of the wheel, two books with folded covers are discharged. These books are discharged directly upon a rearward supporting shelf, 214, and beneath two reciprocating fingers 215 which are designed to be brought into frictional contact with the flaps of the covers, draw such flaps slightly rearward, and then push their free ends forward in under the edges of the stapled folds of the covers. The fingers comprise curved members formed on the end of an arm 216 which is jointed at its opposite end to the upper end of a lever 217 pivoted to the main frame. The lower end of this lever is provided with a roller 218 which bears against the inner face of a peripheral flange 219, on the cam wheel 71, which flange is provided at a predetermined point with a cam projection 220. The roller is maintained in engagement with the flange by the action of a spring 221$^x$ secured to the lower arm of the lever and to the main frame. (See Fig. 10). During each rotation of the cam, the projection 220 acting in opposition to the spring, effects a short quick oscillation of the lever 217, and perforce a corresponding movement of the two fingers on the pivoted arm 216. This arm extends directly above the space between the two parts of the pocketed wheel, and these parts are connected at or near their peripheries by a series of transverse studs or rollers 221, which correspond in number and position with the pairs of pockets. The under side of the arm is provided with a cam projection 222 with which these studs or rollers successively contact to raise the arm during the travel of the wheel. As the rollers escape the cam the arm descends by gravity, a stud 223 on the arm abutting against the rims of the disks and limiting the descent of the arm. To insure its descent, the arm is preferably provided with a suitable weight, 224, or its equivalent.

The mechanism just described is so organized that the fingers are in raised position when the books are discharged thereunder; and that upon the initial movement of the pocketed wheel the fingers are caused to drop down upon the cover flaps and then move rearward and forward so as to tuck the flaps under the up-turned edges of the stapled folds as above described. As the succeeding pockets approach the discharging point the fingers are raised preparatory to a repetition of the operation on the books next discharged.

The shelf upon which the books are deposited beneath the reciprocating fingers comprises preferably a rigid base plate 225, which is affixed to the ledge 208, and an inclined spring plate 226 affixed at its lower rearward end to the top of the base plate. The books are supported upon the upper portion of the spring plate, and are yieldingly held between the same and the fingers during the tucking operation of the latter.

Preferably the lower or acting portions of the fingers are provided with bearing blocks or shoes 227 of rubber, or other good frictional material, the lower surfaces of which are inclined correspondingly with the top of the cover. Preferably also, the lower ends of the fingers are provided with spurs 228 which project through and slightly beyond the lower faces of the shoes so as to bite the cover flap and thus still more effectually insure the action of the fingers thereon; and the base plate is provided immediately below the raised portion of the spring plate with a bar 229 having short up-projecting spurs 230 which, entering apertures 231 in the plate when the latter is depressed, likewise bite the under side of the cover, and prevent its displacement during the tucking operation. Set screws 233 applied to the bar 229 and engaging the spurs permit nice vertical adjustment of the latter. (See Fig. 29.) When the tucking operation has been completed and the fingers leave the finished book, the spring plate, as it resumes its raised or normal position, frees the book from the underlying spurs, and at the same time tends to throw the book from the machine.

In Figs. 7 and 8 we have indicated conventionally at 234, a register for counting the number of match books produced by the machine, the register being actuated through a vertical rod 235 which is connected with a crank on the shaft 179 of the composition applying mechanism. Each rotation of this shaft indicates the passage of a match book, and hence each resulting reciprocation of the rod actuates the register. The register may be of any usual or approved character.

It is to be understood that we do not limit our invention to the particular form of embodiment thereof herein shown and described, as it is obvious that many of the features of construction and arrangement may be considerably modified without departing from the fair spirit of the invention.

What we claim is—

1. In a machine for making match books, the combination with a traveling carrier having cover receiving and retaining portions, of mechanism for folding the ends of cover blanks to extend substantially parallel to their body portions and for inserting the folded blanks into the carrier with their folded ends forward, and means for feeding match cards having headed splints to the carrier and placing them in their respective covers parallel to the body portions of the latter and with the heads of the splints extending rearward.

2. In a machine for making match books, the combination with a traveling carrier having cover receiving and retaining portions, of mechanism for folding the ends of cover blanks to extend substantially parallel to their body portions and for inserting the folded blanks into the carrier with their folded ends forward, means for feeding the blanks successively to said mechanism, and means for feeding match cards having headed splints to the carrier and placing them in their respective covers parallel to the body portions of the latter and with the heads of the splints extending rearward.

3. In a machine for making match books, the combination with a carrier having cover receiving and retaining portions, of mechanism for folding the ends of cover blanks to extend substantially parallel to their body portions and for inserting the folded blanks into the carrier with their folded ends in forward position and projecting beyond the outer side of the carrier, and means for feeding match cards having headed splints to the carrier and placing them in their respective covers parallel to the body portions of the latter and with the heads of the splints extending rearward.

4. In a machine for making match books, the combination with a traveling carrier having cover receiving and retaining portions, of mechanism for folding the ends of cover blanks to extend substantially parallel to their body portions and for inserting the folded blanks into the carrier with their folded ends in forward position and projecting beyond the outer side of the carrier, means for feeding the blanks successively to said mechanism, and means for feeding match cards having headed splints to the carrier and placing them in their respective covers parallel to the body portions of the latter and with the heads of the splints extending rearward.

5. In a machine for making match books, the combination with a traveling carrier having cover receiving and retaining portions, of a magazine for cover blanks, means for feeding the blanks successively therefrom, mechanism to receive the successive blanks, bend or fold one end thereof to extend substantially parallel to the body portions of the blanks, and advance the folded end into the carrier, and means for feeding match cards having headed splints to the carrier and placing them in their respective covers parallel to the body portions of the latter and with the heads of the splints extending rearward.

6. In a machine for making match books, the combination with a traveling carrier having cover receiving and retaining portions, of a magazine for cover blanks, means for feeding the blanks successively therefrom, mechanism to receive the successive blanks, bend or fold one end thereof to extend substantially parallel to the body portion of the blank, and insert the blank into the carrier with its bent or folded end in forward position and projecting beyond the outer side of the carrier, and means for feeding match cards having headed splints to the carrier and placing them in their respective covers parallel to the body portions of the latter and with the heads of the splints extending rearward.

7. In a machine for making match books, the combination with a traveling carrier having cover receiving and retaining portions, of means for feeding cover blanks, a folding member having a passage to which the blanks are successively delivered, a complementary folding blade co-acting with said member to fold the end of an interposed blank to extend substantially parallel to the body portion of the blank and advance the folded end of the blank into the carrier, means for actuating said blade, and means for feeding match cards having headed splints to the carrier and placing them in their respective covers parallel to the body portions of the latter and with the heads of the splints extending rearward.

8. In a machine for making match books, the combination of means for folding the ends of cover blanks to extend substantially parallel to their body portions and for turning partially outward the free edges of the folds to provide flared entrances to the spaces between the end folds and the body portions of the respective blanks, and means for feeding the blanks successively to the said folding means.

9. In a machine for making match books, the combination of a folding member having a passage to which cover blanks are successively delivered, a complementary folding blade co-acting with said member to fold the end of an interposed blank to extend substantially parallel to the body portion of the blank, means for actuating said blade, and means for turning partially outward the free edge of the end fold to provide a flared entrance to the space between said fold and the body portion of the blank.

10. In a machine for making match books, the combination of a folding member having a passage to which cover blanks are successively delivered, a complementary folding blade co-acting with said member to fold the end of an interposed blank, and means (as 72) on said member overhanging the edge of the blank adjacent said passage and adapted to turn partially outward the free edge of the end fold.

11. In a machine for making match books, the combination of a folding member having a passage to which cover blanks are successively delivered, a complementary folding blade co-acting with said member to fold the end of a blank to extend substantially parallel to the body portion of the blank, means for actuating said blade, a carrier comprising a series of clamping members to, through and beyond which the bent or folded end of the blank is advanced by said blade, means for actuating said carrier, and means for feeding match cards to the carrier and placing them in their respective covers parallel to the body portions of the latter.

12. In a machine for making match books, the combination with a plurality of folding devices to which cover blanks are fed, and by means of which the corresponding ends of the blanks are bent or folded to extend substantially parallel to the body portion of the blank, of a carrier comprising a series of clamping members to, through and beyond which the bent or folded ends of the blanks are advanced by said devices, means for actuating said carrier, and means for feeding match cards to the carrier and placing them in their respective covers parallel to the body portions of the latter.

13. In a machine for making match books, the combination with a carrier, of means, including a reciprocating blade, for folding the ends of cover blanks and inserting them directly into said carrier with their folded ends projecting beyond the outer side of the carrier, said folded ends extending substantially parallel to the body portions of the blanks, and means independent of the folding and inserting means for engaging the projecting folded ends of said blanks and preventing retrograde movement thereof with said reciprocating blade.

14. In a machine for making match books, the combination with a carrier, of means for inserting folded cover blanks therein with their folded ends projecting beyond the outer side of the carrier, and a stop or abutment, as 82, located beyond the carrier and arranged to engage the free edges of the folded ends of the blanks to prevent retrograde movement thereof with the inserting means.

15. In a machine for making match books, the combination with a carrier, of means for inserting folded cover blanks therein with their folded ends projecting beyond the carrier, said folded ends extending substantially parallel to the body portions of the blanks and a bar or ledge arranged at the outer side of the carrier to overhang the said projecting folded ends.

16. In a machine for making match books, the combination with a carrier, of means for inserting folded cover blanks therein with their folded ends projecting beyond the carrier, said folded ends extending substantially parallel to the body portions of the blanks, a stop or abutment, as 82, located beyond the carrier and arranged to engage the free edges of the folded ends of the blanks to prevent retrograde movement thereof with the inserting means, and a bar or ledge arranged at the outer side of the carrier to overhang the said projecting folded ends.

17. In a machine for making match books, the combination with a traveling carrier, of means for introducing folded cover blanks thereto, and means for thereafter feeding match cards to the carrier and placing them in their respective covers parallel to the body portions of the latter.

18. In a machine for making match books, the combination with a carrier, of means for inserting covers therein at one part of its traverse, means for inserting match cards having headed splints into said carrier at another part of its traverse and placing them parallel to the covers and with the heads of the splints extending rearward, and means for fastening together the covers and match-cards while in the carrier.

19. In a machine for making match books, the combination with a carrier, of means for inserting covers therein, said covers each comprising a body portion and a folded end portion extending substantially parallel thereto, means for inserting match cards into said carrier and placing them parallel to the bodies of the covers and within the folded ends thereof, means for fastening together the covers and cards while in the carrier, and means for applying striking composition to the folded ends of the covers while in the carrier.

20. In a machine for making match books, the combination with a carrier, of means for inserting therein covers having outwardly projecting flaps, means for inserting match cards into said carrier and placing them parallel to the bodies of the covers, means for fastening together the covers and cards while in the carrier, means for applying striking composition to the covers while in the carrier, and means for folding the outwardly-projecting cover flaps.

21. In a machine for making match books, the combination with a cover carrier, of means for supporting match strips laterally of the path of travel of said carrier, means for severing the margins of said strips to form match cards of predetermined length, and means for feeding such cards successively to the carrier and within the covers carried thereby.

22. In a machine for making match books, the combination with a cover carrier, of means for supporting match strips laterally of the path of travel of said carrier, a cutter whereby said strips are severed at their margins to form match cards of predetermined length, means for feeding the strips to the cutter, and means for feeding the severed cards successively to the covers carried by said carrier.

23. In a machine for making match books, the combination with a carrier for folded cover blanks, of means for supporting a match strip laterally of the path of travel of said carrier, a cutter whereby the margin of a match strip thus supported is transversely severed to produce a match card of predetermined length, means for advancing the card to the carrier and within the fold of a cover blank carried thereby, and means for moving the remainder of the strip endwise to present another portion thereof to the action of the cutter.

24. In a machine for making match books, the combination with a carrier for folded cover blanks, of means for supporting a match strip laterally of the path of travel of said carrier, a cutter whereby the margin of a match strip thus supported is transversely severed to produce a match card of predetermined length, means acting upon the strip to position the margin thereof beneath the cutter, and means for advancing the card to the carrier and within the fold of a cover blank carried thereby.

25. In a machine for making match books, the combination of a carrier for folded cover blanks, of means for supporting a match strip laterally of the path of travel of said carrier, a cutter whereby the margin of a match strip thus supported is transversely severed to produce a match card of predetermined length, means acting upon the strip to position the margin thereof beneath the cutter, means for advancing the card to the carrier and within the fold of a cover blank carried thereby, and means for moving the remainder of the strip endwise to present another portion thereof to the action of the cutter and advancing means.

26. In a machine for making match books, the combination with a cover carrier, of means for supporting a match strip laterally of the path of travel of said carrier, a cutter adapted to sever the margin of a match strip transversely to produce match cards of predetermined length, means for actuating the cutter, means for moving the successively severed cards beyond the cutter and into the carrier and the covers therein, and means for moving the remainder of the strip endwise after the severance of each card therefrom to present another portion of the strip to the actions of the cutter and card moving means.

27. In a machine for making match books, the combination with a cover carrier, of means for supporting a match strip laterally of the path of travel of said carrier, a cutter adapted to sever the margin of a match strip transversely to produce match cards of predetermined length, means for actuating the cutter, means for feeding the match strip transversely to the cutter, means for moving the successively severed cards beyond the cutter and into the carrier and the covers therein, and means for moving the remainder of the strip endwise after the severance of each card therefrom to present another portion of the strip to the actions of the cutter and card moving means.

28. In a machine for making match books, the combination with a cover carrier, of means for supporting a match strip laterally of the path of travel of said carrier, a cutter adapted to sever the margin of a match strip transversely to produce match cards of predetermined length, means for actuating the cutter, a movable member for acting against the end of the strip, a cam, connections between the same and the said member whereby the latter is intermittently actuated to advance the strip to position for the severance of the successive cards therefrom, means for moving the said cards into the carrier and the covers therein, and means for retracting said member when the strip has been finally subdivided.

29. In a machine for making match books, the combination with a cover carrier, of means for supporting a match strip laterally of the path of travel of said carrier, a cutter adapted to sever the margin of a match strip transversely to produce match cards of predetermined length, means for actuating the cutter, a movable member for acting against the end of the strip, a cam, connections between the same and the said member whereby the latter is intermittently actuated to advance the strip to position for the severance of the successive cards therefrom, means for moving the said cards into the carrier and the covers therein, means for maintaining the said member yieldingly depressed at its acting portion, and means for retracting said member when the strip has been finally subdivided.

30. In a machine for making match books, the combination with a cover carrier, of means for supporting a match strip laterally of the path of travel of said carrier, a cutter adapted to sever the margin of a match strip transversely, means for actuating the cutter, a strip-positioning member adapted to bear on the strip, means for moving said member toward the cutter preparatory to the operation of the latter on the strip, and means for moving the successively severed cards into the carrier and the covers therein.

31. In a machine for making match books, the combination with a cover carrier, of means for supporting a match strip laterally of the path of travel of said carrier, a cutter adapted to sever the margin of a match strip transversely to produce match cards of predetermined length, a head carrying said cutter, means for reciprocating the head, a strip-positioning dog, a lever to which it is pivoted, a connection between said head and lever whereby the lever and dog are actuated by the reciprocation of the head, and means for moving the successively severed cards into the carrier and the covers therein.

32. In a machine for making match books, the combination with a cover carrier, of means for supporting match strips laterally of the path of travel of said carrier and in endwise relation to each other, a pair of spaced cutters adapted to sever the margins of the match strips transversely to produce match cards of predetermined length, a head carrying said cutters, means for reciprocating the head, a pair of spaced strip-positioning members adapted to bear on the respective strips, means for simultaneously moving said members toward the respective cutters preparatory to the operation of the latter upon the strips, and means for moving the successively severed cards into the carrier and the covers therein.

33. In a machine for making match books, the combination with a cover carrier, of means for supporting match strips laterally of the path of travel of said carrier, and in endwise relation to each other, a pair of spaced cutters adapted to sever the margins of match strips transversely to produce match cards of predetermined length, a head carrying said cutters, means for reciprocating the head, a pair of spaced strip-positioning dogs, levers to which they are pivoted, connections between said head and levers whereby the levers are simultaneously actuated by the reciprocation of the head, and means for moving the successively severed cards into the carrier and the covers therein.

34. In a machine for making match books, the combination with a cover carrier, of means for supporting a match strip laterally of the path of travel of said carrier, a cutter adapted to sever the margin of a match strip transversely to produce match cards of predetermined length, means for actuating the cutter, means for moving the successively severed cards beyond the cutter and into the carrier and the covers therein, means for moving the remainder of the strip endwise after the severance of each card therefrom to present another portion of the strip to the action of the cutter, a strip-positioning member adapted to bear on the strip, and means for moving said member toward the cutter preparatory to each operation of the latter on the strip.

35. In a machine for making match books, the combination with a carrier having means to hold in close relation to each other folded cover blanks with interposed match cards, the folded ends of the blanks projecting beyond the edge of the carrier, a trackway for the carrier, and actuating mechanism for the carrier, of binding or fastening means to which the projecting ends of the associated covers and cards are successively delivered by the carrier.

36. In a machine for making match books, the combination of a carrier adapted to hold and convey folded cover blanks with interposed match cards, a trackway for the carrier, and actuating mechanism for the carrier, of binding or fastening means to which the associated cards and covers are successively delivered by the carrier and at a point in rear of which means unfastened end folds are free to swing laterally from the body portions of the blanks, and an alarm or signal device including a controlling member with which unfastened folds of the cover blanks engage when they leave the said binding or fastening means.

37. In a machine for making match books, the combination with a carrier for transporting covers comprising each a body portion and a folded end portion extending substantially parallel to the body portion, said folded end portion extending outwardly beyond, and being disposed on the under side of the cover carried by, the carrier, of means for inserting match cards into said carrier and placing them parallel to the bodies of the covers and within the folded ends thereof, means for fastening together the covers and cards while in the carrier, and means for applying striking composition to the underlying folded ends of the covers while in the carrier.

38. The combination with a traveling carrier for match books, having projecting cover flaps, of a device arranged adjacent to the carrier and provided with book receiving pockets, means for actuating said device to bring its pockets successively into alinement with the carrier, means for ejecting the match books edgewise from the carrier into the pockets, whereby the cover flaps project between the pockets and the carrier, and means for engaging the projecting cover flaps and folding them around the heads of the contained matches and upon and substantially parallel to the bodies of said matches.

39. The combination with a traveling carrier for match books having projecting cover flaps, of a device arranged adjacent to the carrier and provided with book receiving pockets, means for actuating the said device to bring its pockets successively into alinement with the carrier, means for ejecting the match books edgewise from the carrier into the pockets, whereby the cover flaps project between the pockets and the carrier, means for engaging the projecting cover flaps and folding them around the heads of the contained matches and upon and substantially parallel to the bodies of said matches, and means for discharging the books from said device.

40. The combination with a carrier for match books having projecting cover flaps, of a rotary wheel mounted adjacent to the carrier and provided with book receiving pockets, means for rotating said wheel to bring its pockets successively into alinement with the carrier, means for ejecting the match books edgewise from the said carrier into the pockets, whereby the cover flaps project between the pockets and the carrier, and means for engaging the projecting cover flaps and folding them around the heads of the contained matches and upon and substantially parallel to the bodies of said matches.

41. The combination with a carrier for match books having projecting cover flaps, of a rotary wheel mounted adjacent to said carrier and provided with a radial book receiving pockets, means for rotating said wheel to bring its pockets successively into horizontal alinement with the carrier, means for ejecting the match books edgewise from said carrier and inserting their bodies into opposing pockets of the wheel, and means for engaging the projecting cover flaps of the match books in said wheel and folding them around the heads of the contained matches and upon and substantially parallel to the bodies of said matches.

42. The combination with a carrier for match books having projecting cover flaps, of a rotary wheel mounted adjacent to said carrier and provided with radial book receiving pockets, means for rotating said wheel to bring its pockets successively into horizontal alinement with the carrier, means for ejecting the match books edgewise from said carrier and inserting their bodies into the opposing pockets of the wheel, and a flap folding strip arranged adjacent to and eccentrically of said wheel.

43. In a machine for making match books having cover flaps and flap-receiving portions, the combination with a book support, of a flap engaging member adjacent thereto, and means for imparting a pushing and pulling engaging action to said member.

44. In a machine for making match books having cover flaps and end folds, the combination with a book support, of a flap engaging member overhanging said support, and means for moving the said member toward and from the support and for imparting a pushing and pulling engaging action to said member.

45. In a machine for making match books having cover flaps and end folds, the combination with means for supporting a match book, of a member adapted to bear upon the said flap, a lever carrying said member, and means whereby said lever is raised and lowered and also reciprocated longitudinally to effect a pushing and pulling action of said member upon the flap.

46. In a machine for making match books having cover flaps and end folds, the combination with means for supporting a match book, of a finger adapted to bear upon the said flap, a lever carrying said finger, a rotary member provided with lever engaging portions, means for actuating said member, and means for longitudinally reciprocating said lever to effect a pushing and pulling action of said finger upon the flap.

47. In a machine for making match books having cover flaps and end folds, the combination with a yielding support for match books, of a reciprocative member adapted to bear upon the said flaps and exert a pushing and pulling action thereon to tuck them under the end folds.

48. In a machine for making match books having end folds and cover flaps, the combination with a yielding support for match books, said support having an aperture therein, of a spur or spurs supported below said aperture, and means adapted to bear upon the cover flap and tuck it under the fold.

49. In a machine for making match books having end folds and cover flaps, the combination with a yielding support for match books, said support having an aperture therein, of a spur or spurs supported below said aperture, and a reciprocative finger adapted to bear upon the said flaps and tuck them under the end folds, the acting surface of said finger having a spur or spurs to engage said flaps.

50. In a machine for making match books, the combination with a carrier having transverse pockets containing yielding clamp members, of means for inserting cover blanks edgewise into said pockets at one part of their traverse, and means for inserting match cards edgewise into said pockets at another part of their traverse, whereby the cover blanks and cards are associated within and transported by the carrier.

51. In a machine for making match books, the combination with a flexible carrier comprising links having yielding clamp members, of means for inserting cover blanks in said links, means for actuating the carrier, and means for feeding headed match cards to the carrier and placing them in their respective covers parallel to the body portions of the latter and with the heads of the splints extending rearward.

52. In a machine for making match books, the combination with a flexible carrier comprising links having yielding clamp members, of means for inserting cover blanks in said links, means for actuating the carrier, means for positively feeding match cards having headed splints to the carrier and placing them in their respective covers parallel to the body portions of the latter and with the heads of the splints extending rearward, and means for fastening together the covers and cards while in the carrier.

53. In a machine for making match books, the combination with a flexible carrier comprising links having yielding clamp members, of means for inserting cover blanks in said links, means for actuating the carrier, means for inserting cards in said links, means for fastening together the covers and cards while in the carrier, and means for applying composition to the covers while in the carrier.

54. In a machine for making match books, the combination with a flexible carrier comprising links having yielding clamp members, of means for inserting cover blanks in said links, means for actuating the carrier, means for inserting cards in said links, means for fastening together the covers and cards while in the carrier, means for applying composition to the covers while in the carrier, and means for folding the outwardly projecting cover flaps.

55. In a machine for making match books, the combination with a flexible carrier comprising links having yielding clamp members, of means for inserting cover blanks in said links, means for actuating the carrier, means for inserting cards in said links, means for fastening together the covers and cards while in the carrier, means for applying composition to the covers while in the carrier, means for folding the outwardly projecting cover flaps, and means for ejecting the books from the carrier.

56. In a machine for making match books, the combination with a flexible carrier comprising links having yielding clamp members, of means for inserting cover blanks in said links, means for actuating the carrier, means for inserting cards in said links, means for fastening together the covers and cards while in the carrier, means for applying composition to the covers while in the carrier, means for folding the outwardly projecting cover flaps, means for ejecting the books from the folding means, and means for tucking the flaps under the end folds of the cover.

57. In a machine for making match books, a flexible carrier comprising hingedly connected links having each a body portion, overhanging end flanges, and an inclined spring member bearing against the under sides of the said flanges.

58. In a machine for making match books, the combination with means for supporting end folded cover blanks, of means for inserting match cards within the folds of the blanks, and a yielding back stop or abutment for the folded ends of the blanks.

59. In a machine for making match books, the combination with a carrier for end folded cover blanks, of means for feeding match cards to said carrier and within the folds of the blanks, and a yielding back stop or abutment for the folded ends of the blanks.

In testimony whereof, we have signed our names to this specification in the presence of two subscribing witnesses, this 31st day of October, 1907.

MICHAEL PARIDON.
THOMAS A. PALMER.

Witnesses:
  B. C. Ross,
  T. M. Root.